(12) United States Patent
Wilman et al.

(10) Patent No.: US 8,273,225 B2
(45) Date of Patent: Sep. 25, 2012

(54) SOLID ELECTRODE

(75) Inventors: Jonathan James Wilman, Sandhurst (GB); Patrick Simon Bray, Truro (GB); Timothy Peter Mollart, Berkshire (GB)

(73) Assignee: Element Six Limited (GB)

( * ) Notice: Subject to any disclaimer, the term of this patent is extended or adjusted under 35 U.S.C. 154(b) by 423 days.

(21) Appl. No.: 12/439,854

(22) PCT Filed: Sep. 5, 2007

(86) PCT No.: PCT/IB2007/002561
§ 371 (c)(1),
(2), (4) Date: Dec. 11, 2009

(87) PCT Pub. No.: WO2008/029258
PCT Pub. Date: Mar. 13, 2008

(65) Prior Publication Data
US 2010/0126879 A1  May 27, 2010

(30) Foreign Application Priority Data

Sep. 5, 2006  (GB) .................................. 0617430.4
Feb. 16, 2007  (GB) .................................. 0703083.6

(51) Int. Cl.
*C25B 9/06*  (2006.01)
*G01N 25/20*  (2006.01)
*G01N 27/26*  (2006.01)

(52) U.S. Cl. ........ 204/268; 204/254; 204/255; 204/269; 204/294; 205/742; 205/746; 205/759; 205/760; 422/79

(58) Field of Classification Search ................... 204/294, 204/268, 254, 255, 269, 290.15; 205/742, 205/746, 759, 760
See application file for complete search history.

(56) References Cited

U.S. PATENT DOCUMENTS

| | | | |
|---|---|---|---|
| 5,399,247 A | 3/1995 | Carey et al. | |
| 5,512,873 A | 4/1996 | Saito et al. | |
| 5,776,323 A * | 7/1998 | Kobashi | 204/294 |
| 6,177,292 B1 | 1/2001 | Hong et al. | |
| 6,306,270 B1 * | 10/2001 | Hanni et al. | 204/268 |
| 7,144,753 B2 * | 12/2006 | Swain et al. | 438/105 |
| 2004/0031761 A1 | 2/2004 | Wunsche et al. | |

FOREIGN PATENT DOCUMENTS

| | | |
|---|---|---|
| EP | 0 659 691 A1 | 6/1995 |
| EP | 0 822 269 A1 | 2/1998 |
| EP | 1 031 645 A | 8/2000 |

(Continued)

OTHER PUBLICATIONS

Okino et al., "Preparation of boron-doped semiconducting diamond films using BF3 and the electrochemical behavior of the semiconducting diamond electrodes," Journal of Fluorine Chemistry 2004, vol. 125, pp. 1715-1722.

(Continued)

*Primary Examiner* — Bruce Bell
(74) *Attorney, Agent, or Firm* — Bryan Cave LLP

(57) ABSTRACT

The present invention provides a solid diamond electrode, a reactor, in particular a reactor comprising an anode, a cathode and at least one bipolar electrode having first and second major working surfaces positioned therebetween wherein the at least one bipolar electrode consists essentially of diamond, and methods in which the reactors are used.

53 Claims, 6 Drawing Sheets

FOREIGN PATENT DOCUMENTS

| | | |
|---|---|---|
| EP | 1 555 337 A2 | 7/2005 |
| EP | 1 571 241 A1 | 9/2005 |
| EP | 1 630 257 A | 3/2006 |
| JP | 07094303 A | 7/1995 |
| JP | 2004-237165 A | 8/2004 |
| JP | 2004237165 A | 8/2004 |
| WO | 03/052174 A2 | 6/2003 |
| WO | 2006/013430 A1 | 2/2006 |

OTHER PUBLICATIONS

Panizza et al., "Application of diamond electrodes to electrochemical processes," Electrochimica Acta 2005, vol. 51, pp. 191-199.

International Search Report for PCT/IB2007/002561 dated Mar. 27, 2009.

UK Search Report for GB 0 617 430.4 dated Feb. 22, 2007 (1 page).

UK Search Report for GB 0 713 464.6 dated Oct. 26, 2007 (1 page).

\* cited by examiner

SOLID ELECTRODE

This application was filed under 35 U.S.C. §371 as a National Stage application of PCT International Application Serial No. PCT/IB2007/002561, filed Sep. 5, 2007. PCT International Application Serial No. PCT/IB2007/002561 claims priority to UK Patent Application GB 0 617 430.4, filed Sep. 5, 2006, and GB 0 703 083.6, filed Feb. 16, 2007, each of which is incorporated herein by reference in its entirety.

The present invention relates to a reactor comprising a solid diamond bipolar electrode for use in a method of treating waste water.

All documents referred to herein are hereby incorporated by reference.

Waste water contains a number of pollutants which may be organic or inorganic in nature e.g. cyanides and phenols. Electrochemical oxidation of waste water is a well known method for reducing the amount of pollutants present.

Electrochemical processes are preferred as compared to the use of powerful chemical oxidants on the basis that they are safer and more environmentally friendly.

It is known that the size of the electrochemical reaction surface in a reactor is key to the rate of electrochemical reaction that occurs. Therefore, the larger the available surface area, the greater the rate of electrochemical oxidation. With this in mind, bipolar electrode arrangements are of particular interest. A bipolar electrode is created by placing a third electrode between a cathode and an anode. Upon application of a potential between the anode and cathode, the bipolar electrode functions both as an anode and a cathode, vastly increasing the available anode and cathode surface area while still requiring only two electrical connections.

Diamond electrodes, in particular, boron-doped diamond electrodes are useful in electrochemical applications owing to a number of properties, which are significantly different to the properties of other electrode materials such as glassy carbon or platinum. These properties include the high hardness, high thermal conductivity and chemical inertness associated with diamond and the wide electrochemical potential window of conductive diamond.

The use of both solid diamond electrodes and diamond coated electrodes in electrochemical systems has been described. For example, EP 0 659 691 and U.S. Pat. No. 5,399,247 describe solid diamond electrodes and coated diamond electrodes used as the anode in a method of treating a solute in a liquid solution. In general, diamond coated electrodes are preferred because they are cheaper to make, with the absolute cost of a solid diamond electrode being significantly higher than that of a diamond coated electrode. There are a number of other advantages to diamond coated electrodes taught by the prior art, including enhanced toughness provided to the electrode by the substrate, for example where this is a metal.

The use of diamond coated bipolar electrodes in an electrochemical cell has been described in U.S. Pat. No. 6,306,270.

In the context of electrochemical processes, there is a continuing need for electrodes with increased operational lifetimes. Diamond coated electrodes suffer from the problem of pin-holes which allow the liquid being treated to penetrate the coating and electrochemically attack the interface between the diamond coating and substrate resulting in delamination. This is a problem that can be reduced by increasing the thickness of the diamond coating. However, to increase the thickness of the diamond coating is generally understood to be undesirable as it significantly increases production time and material costs. The problem of short operational lifetimes of electrodes is one which is exacerbated where the electrodes are driven at high current densities.

Solid diamond electrodes have longer lifetimes, however, a disadvantage of such electrodes is achieving the required conductivity as compared to a diamond coated electrode where the substrate which is coated with the diamond provides the conductivity and hence the conductivity of the diamond layer is less of a concern.

Generally, in order to achieve the required conductivity, heavy doping of diamond is required. It has, however, been found that heavily doped regions in diamond electrodes tend to be eroded more quickly through etching by organic solvents than lightly doped regions.

In order to overcome this problem, WO2006/013430 describes that erosion of a solid diamond electrode can be reduced by coating the working surface(s) of the electrode with a thin layer of lightly doped diamond (i.e. a passivation layer). This has the effect of reducing erosion at the working surface(s) while maintaining the required conductivity in the bulk of the diamond layer. However, it adds an additional coating step to the production process or an additional step during deposition wherein the boron concentration has to be adjusted.

WO 2006/061192 describes a method and a device for treating waste water containing pesticides. In the method described, the waste water to be treated is passed through an electrochemical cell comprising a boron doped diamond electrode.

US 2004/003176 describes the electrolytic disinfection of drinking water using an electrochemical cell comprising an anode positioned between two gas diffusion electrodes. The anode may be a boron doped diamond electrode.

An object of the present invention is to provide a reactor which maximises the available electrochemical reaction surface and to obtain a long operational lifetime without requiring additional production steps.

The present invention provides a reactor comprising an anode, a cathode and at least one bipolar electrode having first and second major working surfaces positioned therebetween wherein the at least one bipolar electrode consists essentially of diamond and the diamond comprises a dopant such that the diamond is conductive and has an electrical resistivity of 1 MΩcm or less and wherein the average concentration of the dopant in a region of at least one of the major working surfaces, to a depth of 50 nm, is at least $8 \times 10^{19}$ atoms/cm$^3$.

In this way the electrochemical cell has solid diamond electrode(s) in a bipolar arrangement. This results in an increase in the operational lifetime of the at least one bipolar electrode while avoiding the need for additional production steps.

Advantageously, solid diamond can be used as a bipolar electrode without the need to alter the concentration of dopant present at the major working surfaces which will be in contact with the electrochemical environment to form a passivation layer. Surprisingly long operational lifetimes are observed, even at high current densities The term "bipolar electrode" as used hereinafter refers to an electrode which, when placed between an anode and a cathode across which a potential is applied, will behave as both an anode and cathode. Thus a bipolar electrode necessarily has two major working surfaces in contact with the electrolyte. Furthermore, a bipolar electrode does not require a separate electrical connection, although one or more may be provided for monitoring purposes, for example.

The present invention also provides an electrode consisting essentially of diamond wherein the diamond comprises a dopant such that the diamond is conductive and has an electrical resistivity of 1 MΩcm or less and wherein the average concentration of dopant in a region of a least one of the major working surfaces, to a depth of 50 nm, is at least $8 \times 10^{19}$ atoms/cm³ and wherein the electrode has at least one of the following features:
   a) the concentration of dopant atoms in any 1 mm³ volume does not vary from the concentration of dopant atoms in any other 1 mm³ by more than 50%,
   b) the uniformity of doping through the thickness of the electrode when measured by SIMS at least five points approximately uniformly spaced through the thickness is such that the maximum dopant concentration is less than about 150% of the mean value and the minimum concentration is greater than about 50% of the mean value,
   c) a thickness in the range 0.2 mm to 5 mm,
   d) at least one lateral dimension of at least 10 mm, and,
   e) a surface area of at least 10 cm².

Preferably the electrode of the present invention has at least two, preferably at least three, preferably at least four, preferably all five of features a) to e) above.

The electrode of the present invention may be used as the bipolar electrode in the reactor of this invention. All features of the electrode of the invention described herein may also be present in the bipolar electrode of the reactor of this invention. As used herein, the term electrode must be understood to refer to the characteristics of the bipolar electrode of the reactor of this invention.

The term "diamond" includes but is not limited to diamond which has been made by a chemical vapour deposition (CVD) process, preferably a microwave plasma CVD process, diamond made by a high temperature—high pressure process and natural type IIb diamond. The diamond may be polycrystalline or single crystal diamond. Preferably the diamond is polycrystalline diamond, preferably made by CVD The term "consisting essentially of" as used herein requires that the functional behaviour of the electrode is provided by diamond and the dopants within it, and in particular that there is no other identifiable material such as a substrate, providing useful function to the electrode. This term is not intended to preclude the possibility that other components or features may be added to the electrode, for example one or more electrical connections may be added using metallization, brazing or other bonding means.

An advantage of the invention is that the need for a passivation layer at the surface of the bipolar electrode is avoided. Passivation layers are known in which the working surface of the electrode is only lightly doped compared to the bulk. In contrast, it is a feature of the present invention that the average concentration of the dopant in a region of a major working surface to a depth of 50 nm is at least about $8 \times 10^{19}$ atoms/cm³. In this way, the region of the diamond at the at least one major working surface is doped sufficiently highly for the diamond in this region to be conductive.

Preferably the average concentration of dopant in a region of both major working surfaces to a depth of 50 nm is at least $8 \times 10^{19}$ atoms/cm³.

The average concentration of dopant in a region of a major working surface to a depth of about 50 nm may be determined using any technique used conventionally in the art.

Preferably the region of the major working surface in which the average concentration is determined is across substantially the entire major working surface(s).

An example of a suitable technique is secondary ion mass spectrometry (SIMS) depth profiling. SIMS is a very sensitive technique which can be used to perform elemental analysis of thin layers, typically in the range of a few nm to a few μm. In this technique, the surface is sputtered by a primary ion beam and the portion of sputtered material that leaves the surface as ions is analysed by mass spectrometry. By comparing the count rate of a particular species to a standard concentration and by determining the depth of the sputter hole, a profile of depth vs concentration can be generated. A set of values can be taken in a given area and then averaged.

The average concentration of the dopant can be determined over the whole surface. In practical terms, however, it is more usual to take a set of values in a given area and then average them.

The average concentration of the dopant may be measured in a square of area of about 0.01 mm², 0.05 mm², 0.10 mm², 0.20 mm², 0.25 mm², 0.5 mm², 1 mm² on a working surface to a depth of about 50 nm from the major working surface.

The present invention is not limited by reference to the technique used to determine the average value. For example, one technique which may be employed is a "17-point array technique". This technique involves taking a measurement by SIMS at 17 different points in the area defined on the surface of the bipolar electrode. The values are generally recorded from the raw "as-grown" conductive diamond wafer. The 17-point array technique is particularly appropriate for use where the diamond wafer has been produced by a microwave plasma technique as such a diamond wafer will typically have a circular shape.

With reference to all of the measurements used to characterise the material of the electrode of the present invention, the skilled person will understand that where the measurement is described as being made at a "point", such as in the 17-point array technique, it is actually made over an area. The point to which reference is made is a point within the area and is generally the centre of the area over which the measurement is taken. As will be appreciated by the skilled person, the dimensions of the area over which the measurement is made are dependent on the technique in question. For example, resistivity measurements, using the four point probe technique described below, are generally made over an area of approximately 6 mm×1 mm (which are the dimensions of the probe). In contrast, SIMS measurements are made over an area which is typically less than about 0.5 mm×0.5 mm.

In the 17 point array technique, the 17 points are arranged with one point in the centre, eight points uniformly distributed around a perimeter located at a distance which is approximately 45% of the distance from the edge of the wafer to the centre, and eight points uniformly distributed around a perimeter located at a distance of approximately 90% of the distance from the centre to the edge. The measurements obtained are then averaged. While 17 points have been taken in the present case, it can be envisaged that an average over a fewer or a greater number of points can be obtained using the same technique.

As noted above, the average concentration of the dopant in a region of at least one of the major working surfaces, to a depth of 50 nm, is at least $8 \times 10^{19}$ atoms/cm³.

Preferably the average concentration of the dopant in a region of at least one of the major working surfaces, to a depth of 60 nm, is at least $8 \times 10^{19}$ atoms/cm³.

Preferably the average concentration of the dopant in a region of at least one of the major working surfaces, to a depth of 70 nm, is at least $8 \times 10^{19}$ atoms/cm³.

Preferably the average concentration of the dopant in a region of at least one of the major working surfaces, to a depth of 80 nm, is at least $8 \times 10^{19}$ atoms/cm³.

Preferably the average concentration of the dopant in a region of at least one of the major working surfaces, to a depth of 100 nm, is at least $8 \times 10^{19}$ atoms/cm$^3$.

In a further embodiment, the present invention provides a reactor comprising an anode, a cathode and at least one bipolar electrode having first and second major working surfaces positioned therebetween wherein the at least one bipolar electrode consists essentially of diamond and the diamond comprises a dopant such that the diamond is conductive and has an electrical resistivity of 1 MΩcm or less and wherein the average concentration of the dopant in a region of least one of the major working surfaces, to a depth of 50 nm, is greater than 1/5 of the average concentration of the dopant in the remainder of the at least one bipolar electrode.

In this embodiment, preferably the average concentration of the dopant in a region of least one of the major working surfaces, to a depth of 50 nm, is greater than 1/4 of the average concentration of the dopant in the remainder of the at least one bipolar electrode.

In this embodiment, preferably the average concentration of the dopant in a region of least one of the major working surfaces, to a depth of 50 nm, is greater than 1/3 of the average concentration of the dopant in the remainder of the at least one bipolar electrode.

In this embodiment, preferably the average concentration of the dopant in a region of least one of the major working surfaces to a depth of 50 nm is greater than 1/2 of the average concentration of the dopant in the remainder of the at least one bipolar electrode.

In this embodiment, preferably the average concentration of the dopant in a region of least one of the major working surfaces to a depth of 50 nm is not significantly less than the average concentration of the dopant in the remainder of the at least one bipolar electrode.

The average concentration of dopant at the surface of the electrode may for example be determined as described above. The average concentration in the bulk may, for example, be measured by preparing a cross-section, to reveal material originally forming the bulk, at a surface, and then by analysing this surface as described above.

A further physical property used commonly to describe an electrode is its resistivity. The electrical resistivity values as defined herein are the values as determined at room temperature or about 20° C. The resistivity of an electrode can be calculated by measuring the surface resistance and converting the value obtained to a bulk resistivity measurement.

For instance, a four point probe technique may be used to measure the surface resistance of an electrode. As is well known in the art, a four point probe consists of four, typically spring-loaded, electrodes arranged along a straight line. All four electrodes are placed in electrical contact with the surface under analysis. A current I is caused to flow between the two outermost electrodes. The current is normally fixed. The voltage between the two innermost electrodes is then measured. The measured voltage and the fixed current allow the determination of the surface resistance using Ohm's law, specifically:

$$R = V/I$$

where V is the voltage difference between the two measurement points and I is the forced current flowing between the two measurement points.

The resistance as determined above is determined at room temperature or about 20° C.

An example of a suitable apparatus for determining this measurement is a Jandel Cylindrical hand held Four point Probe in combination with a suitable meter such as a TTi BS407 Precision Milli/Micro Ohm meter.

The surface resistance measured can be used to calculate the electrical resistivity of the bipolar electrode using the relationship:

$$\rho = R\pi t / \ln 2$$

where t is the thickness of the bipolar electrode in cm and R is the resistance determined as defined above in Ω and the resistivity ρ is in Ωcm.

In general, the resistivity values are not corrected for either the spacing of the measurement points being similar to the thickness of the bipolar electrode nor for the fact that some of the measurements are being made close to the edge of the sample where the theory assumes a semi infinite plane.

As used herein and described above, the term "conductive", means having an electrical resistivity at room temperature or about 20° C. of about 1 MΩcm or less, preferably about $1 \times 10^5$ Ωcm or less, preferably about $1 \times 10^4$ Ωcm or less, preferably about $1 \times 10^3$ Ωcm or less, preferably about $1 \times 10^2$ Ωcm or less, preferably 10 Ωcm or less, preferably 1 Ωcm or less.

Preferably, the electrode of the present invention has an electrical resistivity in the range from about 0.005 Ωcm to about 10 Ωcm, preferably from about 0.005 Ωcm to about 5 Ωcm, preferably from about 0.005 Ωcm to about 0.5 Ωcm, preferably from about 0.01 Ωcm to about 0.50 cm, preferably in the range from about 0.02 Ωcm to about 0.4 Ωcm, preferably in the range from about 0.03 Ωcm to about 0.3 Ωcm, preferably about 0.04 to about 0.2 Ωcm, preferably in the range from about 0.05 Ωcm to about 0.1 Ωcm.

A method which may be used to determine an average value for a number of measurements across the surface is "17-point array technique" as described above. This technique is one of many which may be used to determine the average resistivity of the diamond electrode.

The diamond comprises one or more dopant elements in order that it is conductive. The dopant element may be selected from, for example, lithium, beryllium, nitrogen, phosphorous, sulphur, chlorine, arsenic, selenium or boron. Preferably the dopant element is boron. Boron has a low activation energy and thus provides a high conductivity at room temperature. Doping can be achieved by implantation but is preferably achieved by incorporation of the dopant element during synthesis of the diamond layer e.g. during synthesis of the diamond by microwave plasma CVD. An example of a suitable doping procedure where the diamond is polycrystalline diamond is as described in EP 0 822 269. An example of a suitable doping procedure where the diamond is single crystal diamond is, for example, described in WO 03/052174.

Where the dopant element is boron, it may be incorporated into the diamond during growth from solid, liquid or gaseous sources. The use of gaseous sources is preferred as these are easier to control. Gaseous sources of boron include boron hydrides such as $BH_3$ and $B_2H_6$ and boron halides such as $BF_3$ and $BCl_3$. Preferably the boron source is $B_2H_6$ and the $B_2H_6$ is delivered in a carrier gas such as $H_2$ at a concentration of between 1 ppm and 1000 ppm.

The average dopant concentration is preferably at least about $8 \times 10^{19}$ atoms/cm$^3$, preferably at least about $1.0 \times 10^{20}$ atoms/cm$^3$, preferably at least about $1.2 \times 10^{20}$ atoms/cm$^3$, preferably at least about $1.4 \times 10^{20}$ atoms/cm$^3$, preferably at least about $1.5 \times 10^{20}$ atoms/cm$^3$. The average dopant concentration is preferably less than about $3 \times 10^{21}$ atoms/cm$^3$, preferably less than about $2.0 \times 10^{21}$ atoms/cm$^3$, preferably less than about $4.0 \times 10^{20}$ atoms/cm$^3$, preferably less than about $6.0 \times 10^{20}$ atoms/cm$^3$.

Preferably, the dopant is dispersed uniformly throughout the electrode. The uptake of impurities or dopant element into a growing crystal such as CVD diamond can be sensitive to a number of factors. In particular, the uptake of dopant may be affected by the presence of other defects, such as dislocations or other impurities. In addition, the crystallographic face on which growth is taking place may also affect uptake of dopant. The common crystallographic faces in CVD diamond are the {100}, {110}, {111}, and {113} faces. The relative uptake of impurities in the growth sectors formed by these different faces is very different, and may also vary with growth conditions. For example, the {111} growth sector typically takes up somewhere between 10 and 30 times as much boron as the {100} growth sector. As a consequence of the differential uptake of boron between the different growth sectors, any CVD diamond which includes both the {111} and the {100} growth sectors, such as typical polycrystalline CVD diamond, shows huge local variations in boron concentration. It is for this reason that a minimum sample area or volume is generally specified for measurement of uniformity, these areas or volumes being sufficiently large to average out the concentration variations due to the polycrystalline nature of the diamond, but small enough to determine deleterious variation on a larger scale, for example from poor control of the synthesis conditions In this context, the term "uniform" is intended to refer to the dispersion of dopant when viewed over the whole volume of the bipolar electrode and allows for the possibility that there may be local variations at some growth sectors. More specifically, it is preferred that the uniformity is such that the concentration of dopant atoms, as measured, for example by SIMS in any 1 mm$^3$, preferably 0.2 mm$^3$, preferably 0.03 mm$^3$, volume does not vary from the concentration of dopant atoms in any other 1 mm$^3$, preferably 0.2 mm$^3$, preferably 0.03 mm$^3$ by more than about 50%, preferably 30%, preferably 20%, preferably 10%.

Preferably, the uniformity of doping through the thickness of the electrode is such that for a series of at least 5 measurements taken at regularly spaced intervals along a line perpendicular to a major working surface of the electrode, the maximum dopant concentration measured is less than about 150%, more preferably less than about 130% of the mean value and the minimum dopant concentration is more than about 50%, preferably more than about 70% of the mean value. Preferably the end measurement point is positioned at a distance from the major working surface which is the same as the separation between adjacent measurement points.

An advantage of the present invention is that diamond may be used as the electrode in its as-grown form without requiring further processing. Preferably, one major working surface may be the as-grown nucleation face. Preferably, one major working surface may be the as-grown growth face. This is advantageous because it ensures that the flow of fluid across the surface of the electrode is turbulent thus minimising or preventing any formation of a stagnation layer.

The first major working surface may be the as grown nucleation face while the second major working surface may be the as grown growth face.

The as-grown growth face of the electrode preferably has a surface roughness, Ra of about 5 µm or more, preferably about 10 µm or more, preferably about 20 µm or more, preferably about 30 µm or more.

The average grain size at the growth surface is generally greater than the average grain size at the nucleation surface.

The average grain size at the nucleation surface, where the average is the modal grain size, is preferably less than 5 µm, preferably less than 3 µm, preferably less than 1 µm.

The average grain size at the growth surface, where the average is the modal grain size, is preferably greater than t/40 µm, where t is the mean thickness of the layer in µm, preferably greater than t/30 µm, preferably greater than t/20 µm.

Alternatively, the as-grown growth face and/or the as grown nucleation face may be processed to provide the bipolar electrode. For example, it may be advantageous to remove nucleation material from the nucleation face down to a given depth or it may be advantageous to process the growth face to provide a substantially flat surface modifying the growth sectors or crystallographic orientation of the exposed surfaces of individual grains presented at the surface. Additionally, it may be advantageous to trim the edges of the as-grown wafer prior to use as an electrode by a laser process or other process used conventionally in the art. One particular method of processing this type of conductive diamond is to use electro-discharge machining.

The electrode of the present invention may be of any size or shape as appropriate to the end application of the reactor. For example, the electrode may be square, rectangular, circular, cuboid or spherical. Preferably the electrode is planar. In applications where a pressure differential is maintained across the electrode, an electrode curved in three dimensions, for example in the form of a spherical segment, preferably with a large radius of curvature, may be beneficial. The electrode may have a longest dimension of at least about 10 mm, preferably at least about 30 mm, preferably at least about 45 mm, preferably at least about 60 mm, preferably at least about 95 mm, preferably at least about 120 mm. Preferably the longest dimension of the bipolar electrode is less than about 300 mm, preferably less than 200 mm, preferably less than 170 mm, preferably less than 150 mm.

Preferably the electrode has an absolute strength (fracture stress) as measured for the growth face, of greater than about 300 MPa, preferably greater than about 400 MPa, preferably greater than about 500 MPa, preferably greater than about 600 MPa, preferably in the range from about 350 MPa to about 650 MPa as measured using 3-point bending of 18×2 mm bars, depending on the thickness of the electrode tested. Typically an electrode with a thickness of approximately 550 µm would be expected to have a fracture stress of greater than about 500 MPa. The 3-point bending test is one with which the person skilled in the art will be familiar. In general terms, the sample to be tested rests across two parallel lines of contact. Along a line equidistant between the two lines of contact, a load is applied to the opposite face of the electrode to that being tested. The load required to cause the sample to fracture is recorded. The load required to cause fracture can then be converted into the fracture stress.

The term "major working surface" refers to the surface of the electrode which will be in direct contact with the electrolyte when in use, in the case of a bipolar electrode, will form the anode and cathode when in use. For example, in the case of a planar electrode which is rectangular, the major working surfaces will be the rectangular faces as illustrated in FIG. 1a. In the case of a circular shaped electrode, it is the two circular faces of the electrode which form the major working surfaces as illustrated in FIG. 1b. In the case of a spherical electrode, it can be envisaged that the surface of one hemisphere could form one major working face while the surface of the other hemisphere could form the other major working face. Preferably the major working surfaces of the electrode have a total surface area of greater than about 10 cm$^2$, preferably greater than about 20 cm$^2$, preferably greater than about 30 cm$^2$, preferably greater than about 60 cm², preferably greater than about 100 cm², preferably greater than about 200 cm², preferably greater than about 280 cm², preferably greater than about 350 cm².

Preferably the electrode is used with as-grown surfaces. The electrode is preferably substantially the same area as the as-grown wafer. This minimises wastage of diamond material. Preferably the as-grown wafer is circular. Preferably the electrode as used is circular. There are several advantages associated with a circular electrode. Firstly there is no stress concentration from sharp corners when the electrode is pressurised from one side. Stress concentration is a particular problem for the end electrode in a reactor or for any electrode adjacent to pressure fluctuations arising from the rapid flow of liquid through the reactor. Secondly, having a circular electrode means that the edge of the electrode is generally less difficult to seal than an electrode having a rectangular shape, because all parts of the seal are similar.

Preferably the electrode has a thickness in the range from about 0.2 mm to about 5 mm, preferably from about 0.2 mm to about 2 mm, preferably in the range from about 0.3 mm to about 1.5 mm, preferably in the range from about 0.4 mm to about 1.0 mm. Electrodes which have a thickness within this range are mechanically robust enough to be handled and can withstand the rigours of use while minimising cost and synthesis time, and the resistance in the bipolar cell.

Thickness uniformity may be measured using the 17-point array technique described above. The thickness uniformity of the bipolar electrode is preferably such that the minimum value is more than about 60%, preferably about 75%, more preferably about 80%, more preferably about 85% of the mean value and the maximum value is less than about 135%, preferably about 125%, more preferably less than about 120%, more preferably less than about 115%, of the mean value.

The reactor of the present invention comprises an anode, a cathode and at least one bipolar electrode positioned therebetween.

The reactor of the present invention may further comprise a container that is either substantially electrically insulating or sufficiently large and remote from the electrodes as to not carry a substantial fraction of the current which flows through the reactor. In use, the container holds a fluid that is electrically conductive, preferably a water-based fluid. In use, the electrodes are inserted into the electrically conductive fluid. An electrical power supply capable of passing current is connected to the anode and the cathode, such that an electrical current passes between the anode and cathode via the electrically conducting fluid and the at least one bipolar electrode.

Optionally the reactor may further comprise one or more of at least one fluid inlet and one fluid outlet; and at least one pump and associated pipework to permit the electrically conductive fluid to be circulated through the container, preferably via the inlet and outlet.

The reactor of the present invention may comprise at least about 2, preferably at least about 5, preferably at least about 8, preferably at least about 15, preferably at least about 20, preferably at least 30, preferably at least about 50, preferably at least 70, preferably at least about 100 bipolar electrodes positioned between the anode and the cathode.

Advantageously, the total surface area of the at least one bipolar electrode that is anodic is at least about 5 cm², preferably at least about 10 cm², preferably at least about 20 cm², preferably at least about 50 cm², preferably at least about 75 cm², preferably at least about 100 cm², preferably at least about 200 cm², preferably at least about 500 cm², preferably at least about 1,000 cm², preferably at least about 1,500 cm², preferably at least about 2,000 cm², preferably at least about 2,500 cm².

Alternatively or in addition, advantageously, the total surface area of the at least one bipolar electrode that is cathodic is at least about 5 cm², preferably at least about 10 cm², preferably at least about 20 cm², preferably at least about 50 cm², preferably at least about 75 cm², preferably at least about 100 cm², preferably at least about 200 cm², preferably at least about 500 cm², preferably at least about 1,000 cm², preferably at least about 1,500 cm², preferably at least about 2,000 cm², preferably at least about 2,500 cm².

Alternatively or in addition, advantageously the total surface area of the at least one bipolar electrode that is either anodic or cathodic is at least about 10 cm², preferably at least about 20 cm², preferably at least about 50 cm², preferably at least about 100 cm², preferably at least about 150 cm², preferably at least about 200 cm², preferably at least about 500 cm², preferably at least about 1,000 cm², preferably at least about 2,000 cm², preferably at least about 3,000 cm², preferably at least about 4,000 cm², preferably at least about 5,000 cm².

In use, a potential is applied between the anode and the cathode. The anode and cathode may be formed from any substrate generally used to form such electrodes for use in electrochemical processes. For example, the anode and cathode may be formed from glassy carbon, platinum, solid diamond as defined herein or a diamond coated electrode. The anode and cathode may be formed from the same or from different materials. Preferably the anode and cathode are formed of solid diamond. Preferably the external surface of the anode and cathode is provided with at least one electrical connection and means for current distribution. Preferably the electrical connection is provided by metallization and a brazed or bonded electrical contact.

Where the anode and cathode are formed from the same material, advantageously, the polarity of these electrodes may be reversed periodically to prevent build up of a passivation layer on each of the electrodes.

As the anode and the cathode are generally end electrodes in a reactor, they may have to support a pressure differential across them. An advantageous arrangement is to attach the non working face of the anode or cathode to a metal plate and to make the electrical connection via the opposing face of the metal plate. Attachment may be achieved using a conducting epoxy such as a silver loaded epoxy. Preferably, prior to applying the epoxy, the surface of the diamond may be metallised.

Prior to use in a reactor, the bipolar electrode may be coated around its edges using, for example, silicone or fluorocarbon for the purposes of sealing and protection.

An advantage of the electrochemical cell of the present invention is that the bipolar electrode has a longer operational lifetime thus reducing electrode replacement costs. Preferably the bipolar electrode has an operational lifetime of about $0.2 \times 10^6$ Ah/m² or more, preferably about $0.5 \times 10^6$ Ah/m² or more, preferably about $1 \times 10^6$ Ah/m² or more, preferably about $2 \times 10^6$ Ah/m² or more, preferably about $4 \times 10^6$ Ah/m² or more, preferably about $8 \times 10^6$ Ah/m² or more, preferably about $12 \times 10^6$ Ah/m² or more, preferably about $16 \times 10^6$ Ah/m² or more, preferably about $20 \times 10^6$ Ah/m² or more, preferably about $30 \times 10^6$ Ah/m², preferably about $50 \times 10^6$ Ah/m² or more, preferably about $80 \times 10^6$ Ah/m² or more, preferably about $100 \times 10^6$ Ah/m²

The reactor according to the present invention comprises at least one bipolar electrode. The reactor according to the present invention may further comprise one or more sensors. Preferably the sensors are microelectrode arrays.

In the reactor, the anode and cathode are connected to a power supply. Preferably the electrochemical cell is arranged such that the bipolar electrode(s) are separated from their neighbouring bipolar electrode(s), anode or cathode by a distance in the range from about 0.5 mm to about 50 mm, preferably about 1 mm to about 30 mm, preferably about 1 mm to about 10 mm, preferably about 1.5 mm to about 8 mm, preferably about 2 mm to about 5 mm. This level of separation is advantageous in order to minimise the effect of the electrical resistance of the liquid being electrolysed and is thus a consideration in the efficiency of the system.

Advantageously, the bipolar electrodes may be placed in a carrier plate which incorporates inlet and outlet manifolds to permit the flow of liquid. An advantage of using common inlet and outlet manifolds respectively is that a uniform pressure across the reactor can be achieved. Preferably the carrier plate is made from a plastic selected such that it will not be attacked by the aggressive chemistry which takes place, in use, at the major working surface(s) of the electrode. Preferably the carrier plates are formed from polymethylmethacrylate, preferably poly(methyl-2-methylpropenoate) (often referred to as "acrylic"). Examples of suitable acrylics include Plexiglas, Perspex, acrylite, acrylplast, Altuglas and Lucite. The advantage of using an acrylic is that the carrier plate can be polished such that it is transparent which permits the flow of liquid through each cell to be observed. This provides a means of detecting, for example, any build up of deposit in the flow channels. The bipolar electrodes may be separated using spacers formed from an insulating material in order to guard against contact during use. Preferably the carrier plates act as such insulating spacers.

In a further aspect, the present invention provides a carrier plate adapted for use in a reactor comprising an inlet, an outlet and an aperture provided to house a reaction unit, said carrier plate having a first face and a second face, wherein at least one recess is formed in a face of the carrier plate to provide, in use, a flow channel for a fluid.

The form of the inlet and outlet is not limited. Advantageously the inlet and outlet are provided by apertures positioned at opposite ends of the carrier plate.

One face of the carrier plate comprises at least one recess to provide a flow channel for a fluid. Where the reaction unit is circular, preferably the at least one recess provides fluid entry across an arc of the circle defining the edge of the electrode, such arc lying in the range of 30° to 160°, more preferably 50° to 140°, more preferably 60° to 130°, more preferably 70° to 120°, more preferably 80° to 110°. This is advantageous as it ensures that the flow of fluid is turbulent as it passes over the working surface of the reaction unit. Where the flow of fluid through the reactor is laminar, the dynamics of the flow are such that a stagnation layer may be formed at the surface of the electrode surface. Where the active species are hydroxyl radicals, this may be problematic. If a stagnation layer exists then as a consequence of the short lifetime of hydroxyl radicals, there may be a degradation in the efficiency of the reaction because the hydroxyl radicals cannot pass through the stagnation layer in their lifetime. It is therefore preferable that the flow of fluid across the working surface of the reaction unit is turbulent.

The aperture in the carrier plate is provided to house a reaction unit. Preferably the aperture is of substantially the same size as the reaction unit which it will house. Preferably the reaction unit and aperture are circular. The carrier plate of the present invention will be further described by reference to an embodiment where the reaction unit is an electrode. It will, however, be appreciated that the reaction unit may be any where a flow of a fluid is required to pass across a reaction surface. For example, the reaction unit may be a solid catalyst or a microelectrode or microelectrode array where the carrier plate is to be used in a reactor for a sensing application.

Preferably the reaction unit is an electrode. Preferably the reaction unit is an electrode as described herein.

The aperture is preferably positioned centrally in the carrier plate. The aperture is preferably provided with a recess around its upper edge in which the electrode may sit. The aperture then exposes one face of the electrode.

Preferably the carrier plate is stackable. Preferably the carrier plate has a series of holes around the periphery thereof which facilitate stacking of the carrier plate. By placing bolts or studding through the holes, an assembly of a plurality of such plates can be held together. Preferably a seal is provided around the edge of these holes to enhance connection to an adjacent plate.

Preferably the carrier plate is made from a plastic material. Preferably the plastic material is selected from polypropylene or acrylic. Preferably the plastic material is polymethylmethacrylate, preferably poly(methyl-2-methylpropenoate) (often referred to as "acrylic"). Examples of suitable acrylics include Plexiglas, Perspex, acrylite, acrylplast, Altuglas and Lucite. Alternatively, advantageously the carrier plate is made from a fluorinated plastic material.

The carrier plate of the present invention may be of any shape or size appropriate to its end use. Preferably the carrier plate of the present invention has a rectangular cross section.

The predominant current path through the reactor is from one electrode to the adjacent electrode via the intervening conductive fluid to be processed, and direct contact between the electrodes, such as would form an electrical short circuit is avoided. It is also advantageous for the efficiency of the reactor that the separation between two adjacent electrodes in the reactor is relatively uniform, to ensure an even current distribution across the face of the electrodes. Preferably the separation between two electrodes measured normal to the face of one of them does not vary by more than 30%, preferably 20%, preferably 10%, preferably 5%. It is advantageous that the separation between the electrodes is as uniform as possible as this ensures that the resistance of the liquid between a small area on the surface of one electrode and an equivalent small area on the surface of an adjacent electrode is more or less the same wherever on the electrode the small area is located. By ensuring that the resistances are similar, the current density will be similar. Therefore "hot-spots", which may cause problems such as distortion or a different chemical reaction, will not develop on the electrodes and the system will operate more efficiently.

Advantageously a semi-permeable membrane may be included between adjacent electrodes. Where the fluid to be treated is water, this is particular advantageous as the semi-permeable membrane acts as a solid state electrode which carries current, thus removing any need to add salts to the water to render it conductive. This is also advantageous where the fluid to be treated has a variable conductivity.

Additionally, the semi-permeable membrane acts as a barrier between adjacent electrodes such that different fluids can be passed across the respective working surfaces of the adjacent electrodes without any unwanted interaction between the two fluids.

Examples of suitable semi-permeable membranes include commercially available membranes such as NAFION™, manufactured by Du Pont.

The liquid to be electrolysed may flow in a serpentine manner between the first and second electrodes, then between the second and third electrodes and so on until it has passed through the whole reactor, such that the spaces between the electrodes effectively lie in series to increase the treatment time of a particular volume. Alternatively, in the preferred form of the reactor the spaces between the electrodes may effectively be used in parallel so as to increase the volume of liquid treated. The carrier plate of the present invention is particularly useful where a parallel flow is desired.

In either case, the flow between the first and second and second and third electrodes, and so on, does not provide a "short circuit" for electrical current, since the impedance of the current path through the liquid is designed to be substantially greater than that through the electrodes. A key element to this is generally providing insulating material as a baffle around the edge of each electrode to extend the length of the short circuit path in the liquid. Preferably the baffle function is generally provided by the carrier plate and seals adjacent to the electrode.

The chemical species released at the surfaces of the electrodes during the electrochemical process are extremely aggressive, and can react with and degrade a wide range of materials. The most aggressive of these species appear to be short lived, such that the chemistry is particularly aggressive in the immediate vicinity of the major working surface(s) of the electrodes.

As described above, suitable carrier plates are preferably formed from plastics material in particular acrylic or polypropylene, preferably acrylic. However, even acrylic can be attacked when in direct contact with the electrode.

The present applicant has therefore focussed on developing a means by which the materials which come into direct contact with the electrode can be restricted. Accordingly the present invention provides a method of sealing the edges of an electrode in order to restrict, in use, when mounted in a carrier plate, the materials in direct contact with its major working surface(s) and an electrode with its edges sealed in such a manner. While the method is described herein with reference to electrodes specifically, it will be understood that this is a method which can be applied to any reaction surface where there is a need to restrict contact of certain materials with a working surface. An example of an application where it may also be useful is, for example, in a catalytic reactor where there is a desire to isolate the chemistry taking place at the catalytic surface from the remainder of the reactor.

In a further aspect, the present invention provides a reactor comprising a reaction unit wherein said reaction unit has at least one working surface and wherein the working surface of the reaction unit is isolated from the remainder of the reactor by a seal around its perimeter.

Preferably the seal surrounds an edge of the reaction unit which extends in a direction perpendicular to the direction of flow of the fluid through the reactor. Preferably the seal additionally extends across a portion of the surface area of the working surface of the reaction unit around its perimeter.

Preferably the edges of the electrode are sealed with materials such as silicones and halocarbon polymers, more preferably halocarbon polymers, more preferably fluorocarbon polymers. Advantageously, these materials may be provided in compliant form, acting as a seal, and further providing a degree of compliance to the mounting of the diamond electrodes to load them uniformly and provide a degree of damping to any pressure fluctuations which could otherwise load and fracture the diamond electrodes. This ensures that minimal direct forces are applied to the reaction unit.

Advantageously, the seal may be held in place on the carrier plate by use of a keeper ring. Where a keeper ring is used, it is preferably designed to fit tightly around the perimeter of the seal in a plane perpendicular to the surface of the reaction unit. The keeper ring is generally formed from the same material as the carrier plate. Preferably the keeper ring is made from a plastic material. Preferably the plastic material is selected from polypropylene or acrylic. Preferably the plastics material is polymethylmethacrylate, preferably poly(methyl-2-methylpropenoate) (often referred to as "acrylic"). Examples of suitable acrylics include Plexiglas, Perspex, acrylite, acrylplast, Altuglas and Lucite. Alternatively, advantageously the keeper ring is made from a fluorinated plastic material.

A preferred method is to provide the seals in the form of conventional 'O' rings, with an 'O' ring positioned each side of the electrode and held in place for example by a groove in the carrier plate.

An alternative preferred design (illustrated schematically in FIG. 7) uses a gasket formed with a 'C' cross-section that wraps round the edge of the electrode forming the seal on both sides. It can be seen that in addition to covering the edge of the reactor unit which is perpendicular to the direction of flow of fluid through the reactor, a portion of the surface area of the reaction unit is also covered around its perimeter. This seal then seals to the carrier plate or adjacent carrier plates and the electrode.

In a further preferred design, shown schematically in FIG. 8, a gasket formed with a "G" cross section that wraps around the edge of the electrode and the edge of the carrier plate is used. This is advantageous as it means that a substantially continuous seal is provided when the plates are stacked. Again, the carrier plate is entirely protected from the active chemistry taking place at the working surface(s) of the reaction unit.

While it is advantageous to seal the edges of the periphery of the electrode, the present applicant has also investigated ways in which is can be ensured that the sealing does not prevent the flow of fluid across the electrode required in order for any reaction to proceed.

In this regard, a flow may be maintained in one of several ways. The first option is to ensure that the bottom face of the carrier plates in which the electrode will be housed comprises narrow slots. This has the effect that when the top face of a second carrier plate is placed against the bottom face, channels which permit the flow of fluid are formed.

Alternatively, holes may be included in the carrier plate. Where holes are included in the carrier plate, preferably the diameter of the holes is greater than about 2 mm, preferably greater than about 3 mm, preferably greater than about 4 mm and more preferably approximately equal to about 5 mm. Preferably the diameter of the holes is less than about 10 mm, preferably less than about 9 mm, preferably less than about 8 mm Where a keeper ring is used, holes may be provided in the keeper ring to permit flow of the fluid to be treated across the surface of the reaction unit.

Preferably grooves are provided in the face of the seal which will, in use, be in contact with a further carrier plate when stacked, in use.

Alternatively, the sealed electrode may be provided with holes therethrough. Advantageously the holes may be lined with a rigid tube, such as an acrylic tube, to enhance the stiffness of the holes and thus avoid them becoming too constricted when the seal is compressed.

Preferably the grooves or holes are formed in the seals, and preferably they are formed as holes, and preferably these holes are lined with a rigid tube. These holes or grooves are formed to generally line up with the direction of fluid flow, and thus lie predominantly in the direction parallel to the major face of the carrier in the direction from the inlet aperture to the outlet aperture.

The reactor is preferably assembled in modular format. Preferably the reactor is formed from a plurality of stacked carrier plates as defined herein. Preferably the carrier plates are stacked such that the inlet, outlet and aperture of one carrier plate are aligned with the corresponding parts of the one or more carrier plates adjacent to it. Preferably each carrier plate houses a sealed electrode as described above.

A number of such modular reactor systems may be connected to a common feed and outlet. Accordingly the present invention also provides a modular reactor system comprising a plurality of stacked carrier plates as defined herein.

Advantageously, the two end plates in a stack provide mechanical support and points of entry and exit for the fluid. Where the reactor is comprised of a stack of a small number of carrier plates, preferably these points of entry and exit may lie in one end plate. Alternatively where the reactor is comprised of a stack of a large number of carrier plates, the point of entry is provided in one end plate while the point of exit is provided in the other end plate.

Advantageously, the carrier plates are stacked in a vertical orientation, wherein each plate in the stack is aligned horizontally with respect to its adjacent plates, such that the point of entry is provided in the plate on the bottom of the stack and the point of exit is provided in the plate at the top of the stack. When a liquid is pumped through the stack, any gas generated is pumped out of the point of exit with the liquid. Such an arrangement is particularly advantageous where gas is formed in the electrochemical reaction taking place and, in particular, where the reaction unit is a diamond electrode and a build up of gas could result in cracking of the electrode.

Alternatively advantageously, the carrier plates are stacked horizontally wherein each plate in the stack is positioned vertically with respect to its adjacent plates. In this arrangement, the point of entry is provided on the bottom end of the first plate in the stack and the point of exit is provided on the top side of either the first plate in the stack or, more preferably, the last plate in the stack.

Alternatively the stack may be positioned at some orientation between these two, i.e. the plates are stacked at an angle to the horizontal and wherein each plate is positioned at an angle to the vertical with respect to its adjacent plates. In this arrangement, the plate defined by the axis of the plate from entrance to exit and the plate defined by the direction of stacking the plates together form a vertical plane, and the direction of fluid flow (neglecting local turbulence) has a component which is vertically upwards at all points The description which follows applies equally to all of the carrier plates included within a stack, including the two end plates.

Preferably an electrode is housed in the aperture of each carrier plate. Preferably the electrode has a seal around its periphery as detailed above. Preferably each carrier plate has a number of holes around its periphery, the upper edge of each including a seal.

When the carrier plates are stacked to form a reactor, as each subsequent carrier plate, or end plate is added to the stack, the peripheral seal around the upper edge of each hole in the periphery of the carrier plate is compressed, forming a seal. This is particularly the case where a keeper ring as described above is employed. Where the edge of the electrode has been sealed, at the same time the 'C' seal round the edge of the electrode seals to the plate.

In this way, a plurality of carrier plates can be stacked to form a reactor. Such reactors are useful for processing a range of different electrode materials, and indeed can be used for catalytic processes and analytic processes as well as for waste water treatment. Where the reactor uses solid diamond electrodes the seal to the electrode, in preferred form being a 'C' seal, can be soft and have low compression since a liquid tight seal is not imperative, it must merely reasonably restrict flow from one cell to the next to ensure efficient operation of the process. Where the reactor is used with coated diamond electrodes it is generally more important to obtain a liquid tight seal, since the edge of the electrode is generally more vulnerable to damage from the aggressive nature of the fluid.

In a further aspect, a reactor as described herein may be used in a sensing application. Preferably the reaction units are microelectrodes or microelectrode arrays. Preferably the microelectrode or microelectrode arrays present at least one working surface which comprises portions of conductive material. The remainder of the at least one working surface may be formed from an insulating material. The nature of the microelectrode or microelectrode array is not limited and it may be any microelectrode or microelectrode array as used in this field. Preferably, the microelectrode or microelectrode array comprises conductive diamond as defined herein. In a sensing application, preferably each reaction unit has one or more electrical connections attached thereto.

The potential difference applied between any anode and adjacent cathode in the reactor is preferably in the range from about 0.5 to about 20 V, preferably in the range from about 2 to about 18 V, preferably in the range from about 4 to about 15 V, preferably in the range from about 5 to about 12 V.

The flow through the reactor from the inlet to the outlet is preferably at least about 0.5 $m^3$/hour, preferably at least about 1 $m^3$/hour, preferably at least about 2 $m^3$/hour, preferably at least about 10 $m^3$/hour, preferably at least about 20 $m^3$/hour, preferably at least about 30 $m^3$/hour, preferably at least about 40 $m^3$/hour. Advantageously, by ensuring that such a flow rate is achieved, a surprisingly high current efficiency is observed.

The flow per bipolar electrode through the reactor from the inlet to the outlet is preferably at least about 0.1 $m^3$/hour, preferably at least about 0.2 $m^3$/hour, preferably at least about 0.5 $m^3$/hour, preferably at least about 1.0 $m^3$/hour, preferably at least about 2.0 $m^3$/hour, preferably at least about 4.0 $m^3$/hour. Advantageously, by ensuring that such a flow rate is achieved, a surprisingly high current efficiency is observed.

The reactors of the present invention can be defined by reference to the mass transfer coefficient and surface velocity. In this regard, the present applicant has surprisingly found that when using the reactors of the present invention, by maintaining the surface velocity within a specified range of values, it is possible to obtain high mass transfer coefficients which are indicative of an efficient reactor. The mass transfer coefficient for a given entity is a diffusion rate constant that relates the mass transfer rate, mass transfer area and concentration gradient driving force. Preferably the mass transfer coefficient is at least about $1 \times 10^{-5}$ $ms^{-1}$, preferably at least about $2 \times 10^{-5}$ $ms^{-1}$, preferably at least about $3 \times 10^{-5}$ $ms^{-1}$, preferably at least about $4 \times 10^{-5}$ $ms^{-1}$, preferably at least about $5 \times 10^{-5}$ $ms^{-1}$, preferably at least about $6 \times 10^{-5}$ $ms^{-1}$, preferably at least about $7 \times 10^{-5}$ $ms^{-1}$, preferably at least about $8 \times 10^{-5}$ $ms^{-1}$, preferably at least about $9 \times 10^{-5}$ $ms^{-1}$.

As used herein, the term "surface velocity" refers to the flow of fluid across a working surface of the reaction unit. The surface velocity is preferably at least about 0.1 $ms^{-1}$, preferably at least about 0.2 $ms^{-1}$, preferably at least about 0.3 $ms^{-1}$, preferably at least about 0.4 $ms^{-1}$, preferably at least about 0.5 $ms^{-1}$, preferably at least about 0.6 $ms^{-1}$, preferably at least about 0.7 $ms^{-1}$, preferably at least about 0.8 $ms^{-1}$, preferably at least about 0.9 $ms^{-1}$, preferably at least about 1.0 $ms^{-1}$.

The surface velocity is preferably less than about 10 ms$^{-1}$, preferably less than about 5 ms$^{-1}$, preferably less than about 3 ms$^{-1}$, preferably less than about 2 ms$^{-1}$.

Where the reaction unit accommodated in the recess in the carrier plate of the reactor is a diamond electrode, it is preferred that the surface presented to the flow of fluid is the as-grown surface. This is particularly the case where the fluid to be treated comprises water.

The current density applied to the electrodes is preferably at least about 1000 A/m$^2$, preferably at least about 2000 A/m$^2$, preferably at least about 3000 A/m$^2$, preferably at least about 4000 A/m$^2$, preferably at least about 5000 A/m$^2$.

Advantageously, the reactors of the present invention have a surprisingly high current efficiency. The current efficiency of a reactor is dependent on two variables, specifically the chemical oxygen demand (COD) level and the time of reaction.

COD is a measure of the oxygen equivalent of the organic material and oxidizable inorganic material in effluent which can be oxidized chemically using dichromate in an acid solution, as illustrated by the following equation:

$$C_nH_aO_bN_c + dCr_2O_7^{2-} + (8d+c)H^+ \rightarrow nCO_2 + (a+8d-3c)/2 H_2O + cNH_4^+ + 2dCr^{3+}$$

wherein d=(2n/3)+(a/6)−(b/3)−(c/2)

At high levels of COD, high current efficiencies are observed. As the electrochemical reaction proceeds, the level of COD is reduced and therefore current efficiency will generally reduce with time. By providing reactors with a flow rate as detailed above, surprisingly high current efficiencies have been observed.

When operating at 100% efficiency, 1 amp-hour (Ah) is equal to 298.5 mg of COD. Therefore, the efficiency can be defined as

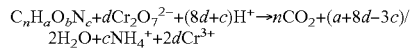

Efficiency=(mg COD destroyed by 1 Ah)/298.5

When the reactor is being used for the destruction of COD, there are two operating regimes: current-limited and diffusion-limited. The current-limited regime is characterised by the rate of COD destruction being proportional to the current density. The diffusion-limited regime is characterised by the rate of COD destruction being approximately constant above a certain current density.

In the current-limited regime, the efficiency of the reactor for the destruction of COD as defined above is preferably at least about 60%, preferably at least about 70%, preferably at least about 75%, preferably at least about 80%, preferably at least about 85%, preferably at least about 90%, preferably at least about 93%, preferably at least about 95%, preferably at least about 98%.

In one embodiment, the reactor of the present invention comprises an inlet; an outlet; at least one diamond electrode, preferably wherein a major working surface of the diamond electrode is the as-grown nucleation face and/or a major working surface of the electrode is the as-grown growth face, preferably having an R$_a$ of about 5 μm or more, preferably about 10 μm or more, preferably about 20 μm or more, preferably about 30 μm or more; said reactor having a mass transfer coefficient of at least about 1×10$^{-5}$ ms$^{-1}$, preferably at least about 2×10$^{-5}$ ms$^{-1}$, preferably at least about 3×10$^{-5}$ ms$^{-1}$, preferably at least about 4×10$^{-5}$ ms$^{-1}$, preferably at least about 5×10$^{-5}$ ms$^{-1}$, preferably at least about 6×10$^{-5}$ ms$^{-1}$, preferably at least about 7×10$^{-5}$ ms$^{-1}$, preferably at least about 8×10$^{-5}$ ms$^{-1}$, preferably at least about 9×10$^{-5}$ ms$^{-1}$; and wherein, in use, the surface velocity of the fluid across a working surface of the diamond electrode is at least about 0.1 ms$^{-1}$, preferably at least about 0.2 ms$^{-1}$, preferably at least about 0.3 ms$^{-1}$, preferably at least about 0.4 ms$^{-1}$, preferably at least about 0.5 ms$^{-1}$, preferably at least about 0.6 ms$^{-1}$, preferably at least about 0.7 ms$^{-1}$, preferably at least about 0.8 ms$^{-1}$, preferably at least about 0.9 ms$^{-1}$, preferably at least about 1.0 ms$^{-1}$.

Preferably in this embodiment, the diamond electrode is circular. Optionally the diamond electrode, which is preferably sealed with a seal as defined herein, is housed in a carrier plate as defined herein.

The reactors of the present invention are useful for the treatment of various effluents. Generally the effluents to be treated are liquid, however, by increasing the size of the inlet and outlet manifolds and increasing the separation between the electrodes, the reactors of the present invention may also be used to successfully treat effluent which contains suspended solids.

There are several further advantages associated with using the reactors of the present invention. Firstly, it has surprisingly been found that in comparison to conventionally used processes, minimal biological sludge is generated, thus avoiding the need to include an incineration step in any treatment process.

Secondly, when using the reactors according to the present invention, it is possible to eliminate all ammonia. In addition to attacking ammonia directly, proteins and amines are attacked and degraded to ammonia which is then subsequently eliminated. This is an advantage as compared to conventional processes wherein it has only previously been possible to eliminate nitrogen already in the form of ammonia.

Without wishing to be bound by any particular theory, it is thought that the effectiveness of the reactors of the present invention is due to the large concentration of hydroxyl radicals produced. Hydroxyl radicals have a short lifetime but are capable of complete mineralization of organic pollutants by oxidation. This is surmised from the rate at which COD is removed and the range of pollutants which may be treated.

In one aspect, the effluent to be treated may be waste water, either industrial or municipal, and in this regard, the present invention further provides a method of treating waste water wherein the water to be treated is passed through a reactor as defined herein. In such a case, the waste water is the electrolyte.

In a further aspect, the effluent to be treated may be pharmaceutical waste and in this regard, the present invention further provides a method of treating pharmaceutical effluent wherein the pharmaceutical effluent to be treated is passed through a reactor as defined herein.

In a further aspect, the effluent to be treated may be waste from the food industry, waste from the carpet industry, waste from the textile dyeing and printing industry, waste from the paper and wood-pulp industries, petrochemical waste, waste from hospitals, waste from the chemical industry, waste from landfill sites or polluted industrial sites, waste from commercial and industrial laundries or waste from bioplants. In this regard, the present invention further provides a method of treating such effluent wherein effluent to be treated is passed through a reactor as defined herein.

Depending on the nature of the liquid to be treated, it may be necessary to add one or more salts to the waste water in order to ensure that it is conductive, with the conductivity preferably matched to the design of the reactor to optimise the efficiency of the system.

The nature of the salt(s) added depends on the effluent to be treated. In particular, it may be desirable to add a chloride or sulphate salt to the effluent to be treated. The levels of salt to be added to the liquid to be treated will in part be determined by discharge regulations and also, in part, by the need to avoid the formation of unwanted by-products. For example, where the liquid to be treated is water, it is advantageous that chloride salts are added because the electrochemical reaction which occurs results in the formation of hypochlorite which then circulates through the system and acts as a disinfectant, providing a "clean-in-place" system. Advantageously, any salts added may be recovered, for example, by reverse osmosis and recycled if desired.

Alternatively or in addition, one or more salts may be added to ensure that the electrical impedance of the fluid between adjacent bipolar electrodes is sufficiently low for operation and preferably less than the electrical impedance between the opposing faces of the bipolar electrode.

As described above, the effluent to be treated may include suspended solids. Where the reactor is suitable for the treatment of liquid only, any solids present may be removed in a first step. An example of a method which may be employed in such a step is "dissolved air flotation" (DAF).

It has been found that by use of a reactor of the present invention, it is possible to reduce the total organic content in waste water to almost zero.

An advantage of using a reactor according to the present invention for treating waste water is that, in contrast to other commonly used systems, there is no need to distinguish between all the species in the effluent. The oxidation process is so thermodynamically favourable for any pollutant molecule present in the waste water that chemical oxygen demand (COD) reduction is the only chemical step for which the kinetics are significant. This means that a simple measure of COD is sufficient to monitor the reaction. With the recent advances in electronic COD sensors, this is a measurement which can be made easily in situ.

A further advantage of the reactors according to the present invention is that they are less restricted with regard to the temperature of the fluid to be treated. In an electrochemical reaction, it is generally the case that there will be an increase in the temperature of the fluid as the reaction progresses. Where the electrode is formed from a metal, this results in a decrease in efficiency because the resistivity of the electrode will increase as the temperature rises and thus attempts are made to control the temperature. In contrast, by using a solid diamond electrode as defined herein, this problem is avoided. The resistivity of boron doped diamond decreases with an increase in temperature and results in an increase in efficiency.

In this regard, the present invention provides a reactor which can be used in an electrochemical process to treat a fluid wherein the fluid is at a temperature of greater than about 30° C., preferably greater than about 40° C., preferably greater than about 50° C., preferably greater than about 60° C., preferably greater than about 70° C., preferably greater than about 80° C., preferably greater than about 90° C.

Preferably the fluid is at a temperature of less than about 90° C., preferably less than about 80° C., preferably less than about 70° C., preferably less than about 60° C., preferably less than about 50° C., preferably less than about 40° C. The preferred operation temperature depends in part on the nature of any salt(s) present. For example, where the liquid to be treated is aqueous and includes chloride salts, it is desirable that the temperature is less than 40° C. in order to avoid the formation of chlorinated organic by-products.

The present invention is hereinafter described by reference to the following figures and examples which are in no way intended to limit the scope of protection claimed.

DESCRIPTION OF THE FIGURES

FIG. 1(a) shows a rectangular shaped solid diamond bipolar electrode (2) which may be used in the electrochemical cell of the present invention. The bipolar electrode (2) has a first major working surface (4) and a second major working surface (6).

FIG. 1(b) shows a circular shaped solid diamond bipolar electrode (12) which may be used in the electrochemical cell of the present invention. The bipolar electrode (12) has a first major working surface (14) and a second major working surface (16).

FIG. 2 shows a cross section through a reactor (20) according to the present invention. A container (22) which is made of an acrylic holds an electrolyte (24) and three solid diamond bipolar electrodes (26) positioned parallel to each other at regularly spaced intervals (28) between an anode (30) and a cathode (32). In use, a potential difference is applied between the anode and the cathode. When used for treating waste water, the electrolyte may be waste water to which salts may be added in order to ensure that it is conductive. The reactor is transparent so it is possible to monitor the flow.

FIG. 3 shows a perspective view of a carrier plate (40) according to the present invention. The carrier plate comprises an inlet (42), an outlet (44) and an aperture (46). A recess (48) is provided in the top face (50) of the carrier plate. An electrode (52) is accommodated in the aperture. The electrode has a seal (53) around its edge to provide a barrier between the carrier plate and the working surface of the electrode. The carrier plate includes a series of bolt holes (54) to facilitate its connection to further carrier plates.

FIG. 4 shows an enlarged view of a sealed electrode (56) as described above. It can be seen that the electrode is sealed around its edges (58). The electrode is shown housed in the aperture (46) of a carrier plate (40) as shown in FIG. 3.

FIGS. 5 and 6 show a reactor comprising a plurality of carrier plates (40), each housing a sealed electrode (56) arranged in a parallel manner. Each electrode is sealed with a seal (57). The reactor further comprises a back plate (62) and a front plate (64). Advantageously, the electrodes may be held in place by a lock ring (66). The end electrodes (59) are connected to the positive and negative terminals of a power supply, respectively. The fluid to be treated is pumped through the inlet (60) and a portion of the fluid passes through each of the carrier plates in the direction of flow shown. The fluid then leaves the reactor via the outlet (63).

In FIG. 7, a gasket formed with a 'C' cross-section (72) is wrapped around the edge of the electrode (74) forming the seal on both sides (76). This seal then seals to the carrier plate (78). As can be seen in the figure, this minimises the direct contact between the carrier plate and the electrode.

In FIG. 8, a gasket formed with a "G" cross section (82) that wraps around the edge of the electrode (84) and the edge of the carrier plate (86) is used. This is advantageous as it ensures that there is no direct contact between the carrier plate or adjacent carrier plates (88) and the electrode.

FIG. 9 shows a cross-section of a sealed electrode (90) according to the present invention. The electrode is sealed with a "C-shaped" seal (92). The seal is held in place by a keeper ring (94). The keeper ring includes holes (96) therethrough in order to allow fluid to come into contact with the surface of the electrode.

FIG. 10 shows an alternative embodiment of a reactor comprising a pair of carrier plates (98), each housing a sealed electrode (100) arranged in a parallel manner. A semi-permeable membrane (102) is positioned between the adjacent carrier plates to separate the adjacent sealed electrodes.

Figure 1A:
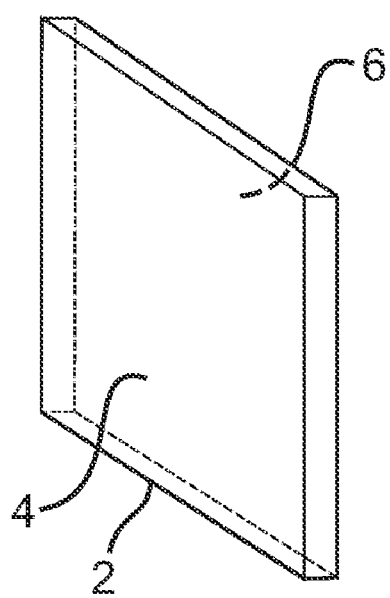
FIGS. 1(a) and 1(b) show rectangular and circular disc shaped bipolar electrodes.
Figure 1B:
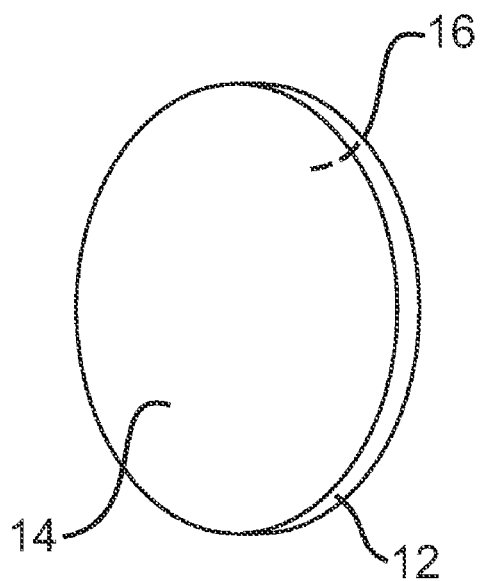
Figure 2:
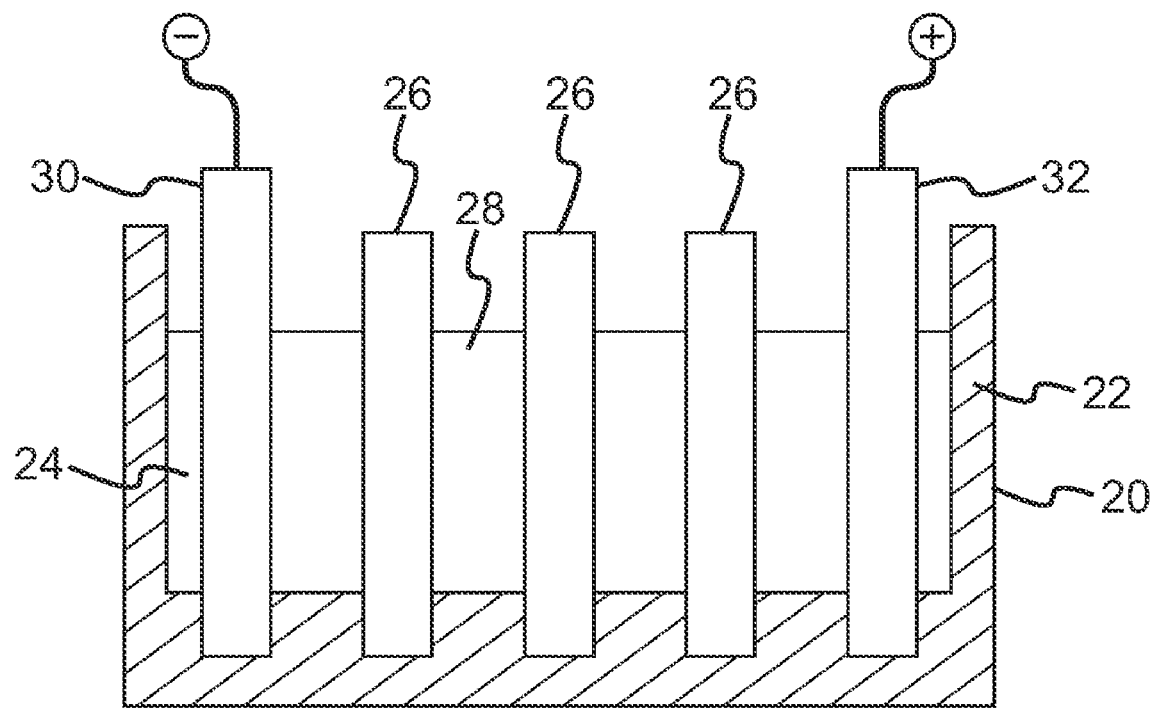
FIG. 2 illustrates an example of a reactor comprising a reactor according to the present invention.
Figure 3:
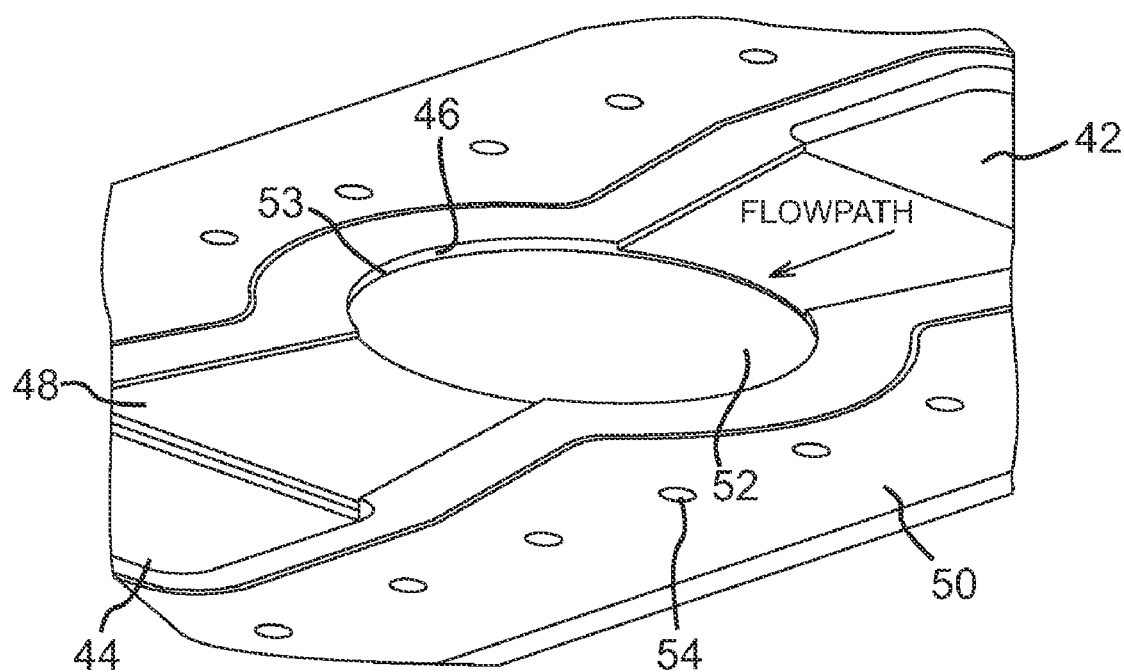
FIG. 3 shows a perspective view of a carrier plate according to the present invention.
Figure 4:
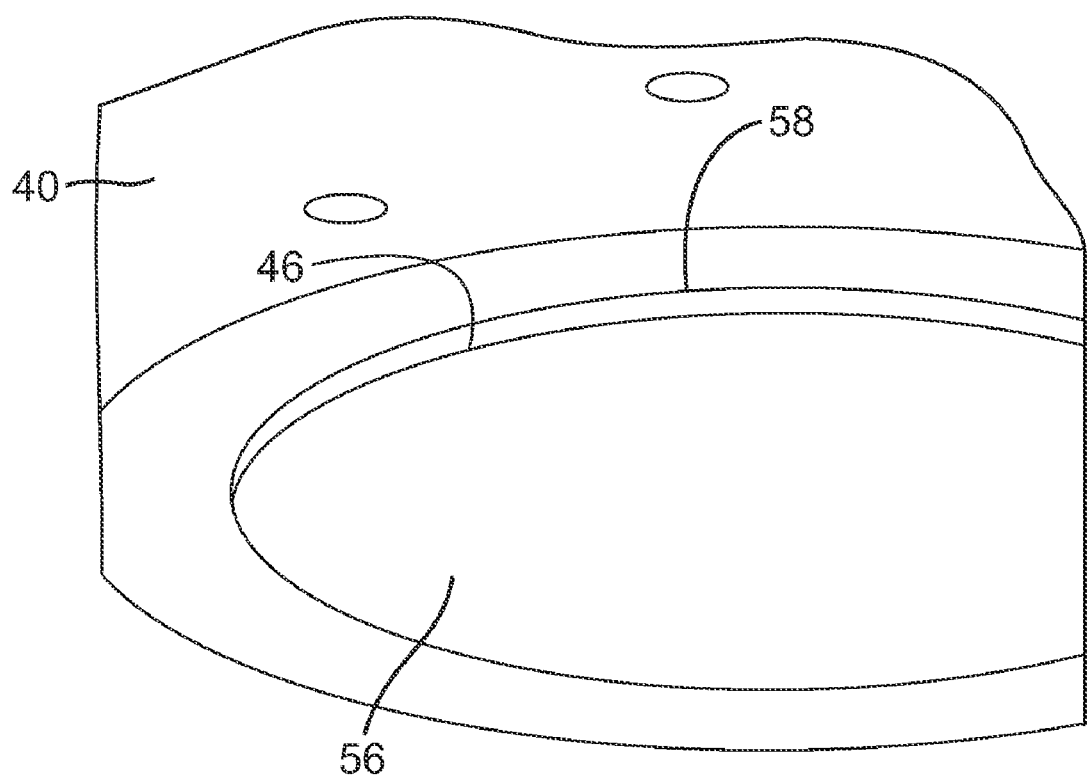
FIG. 4 shows an enlarged view of a sealed electrode of the present invention mounted in a carrier plate.
Figure 5:
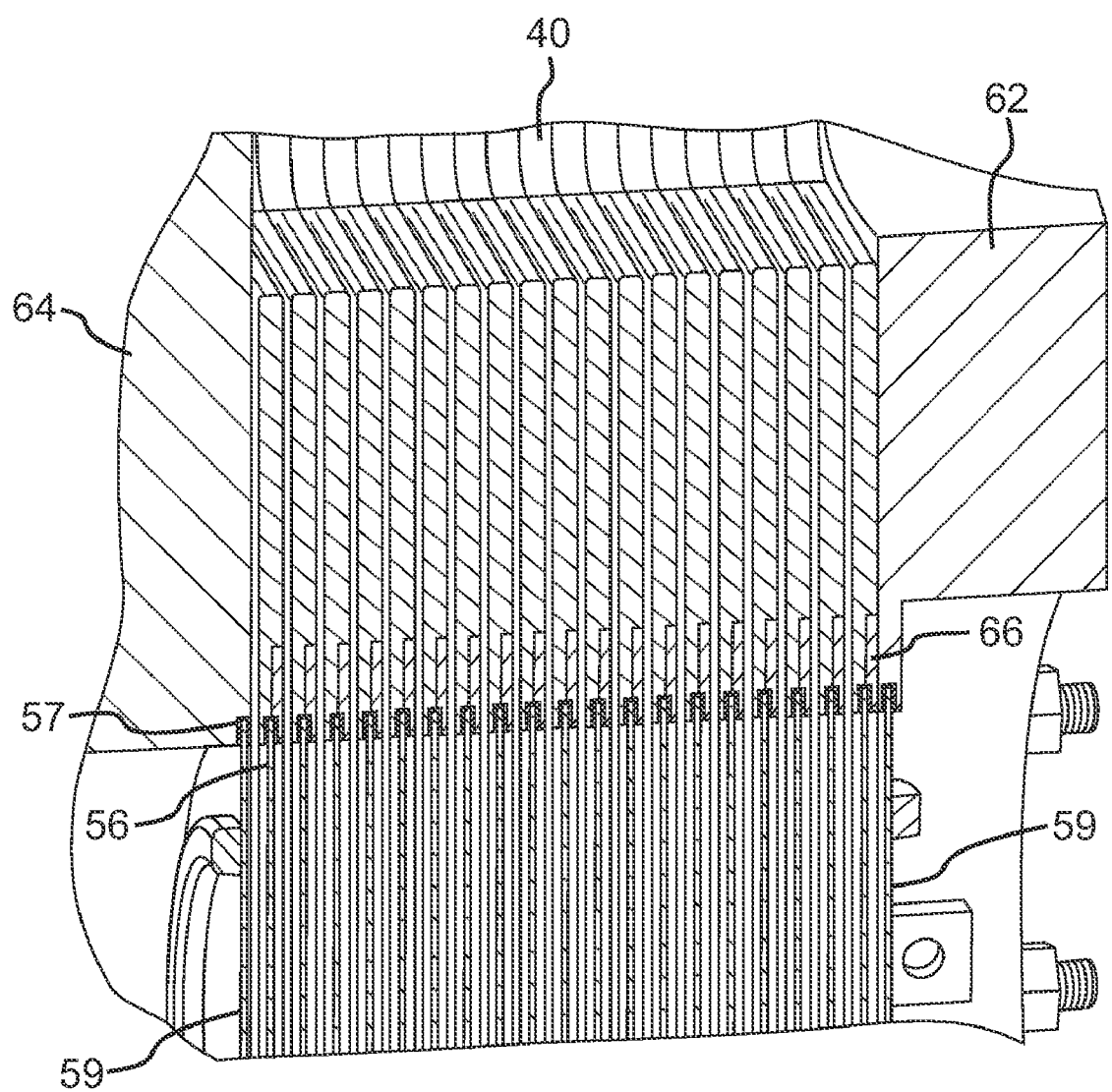
FIGS. 5 and 6 show a plurality of carrier plates stacked to form a reactor.
Figure 6:
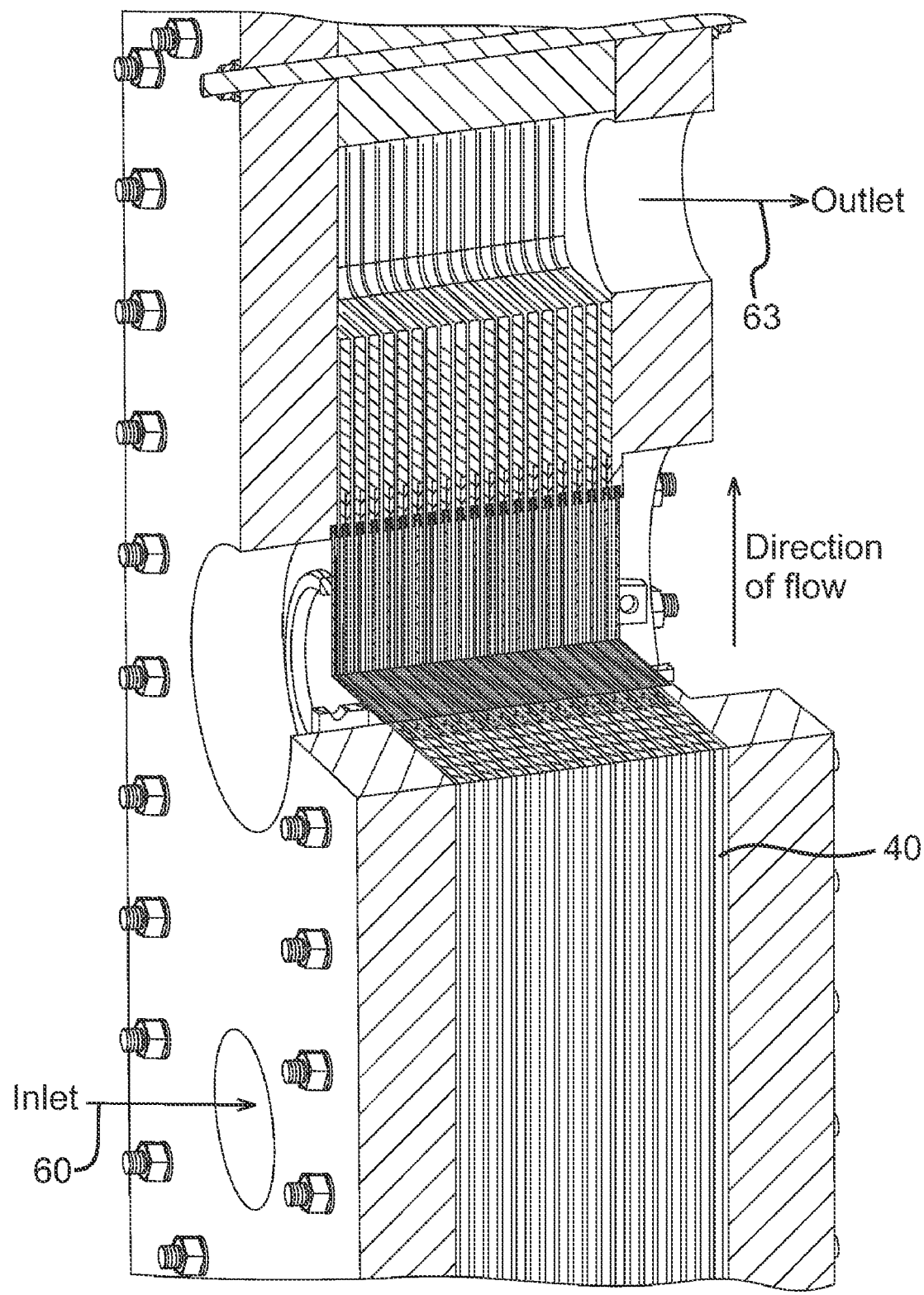
Figure 7:
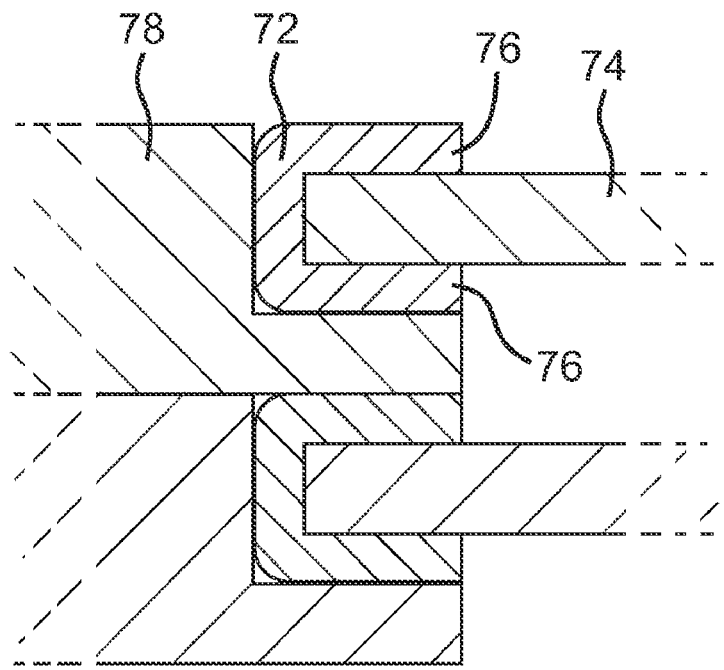
FIG. 7 illustrates an electrode sealed with a "C-shaped" seal according to the present invention.
Figure 8:
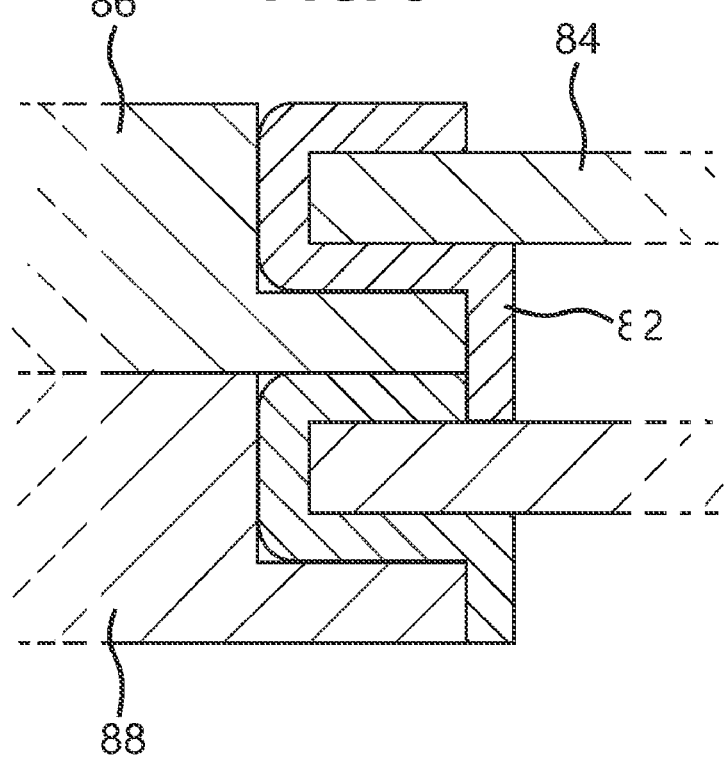
FIG. 8 illustrates an electrode sealed around its edges with a "G-shaped" seal according to the present invention.
Figure 9:
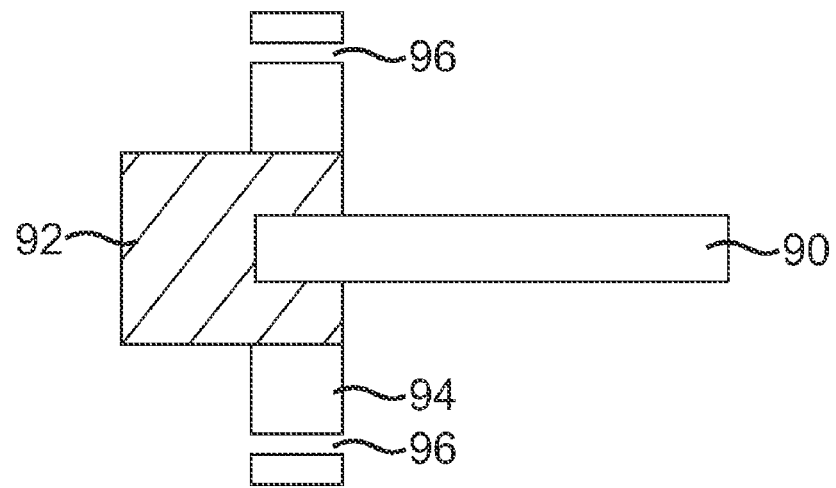
FIG. 9 illustrates a cross-section through a sealed electrode and keeper ring according to the present invention.
Figure 10:
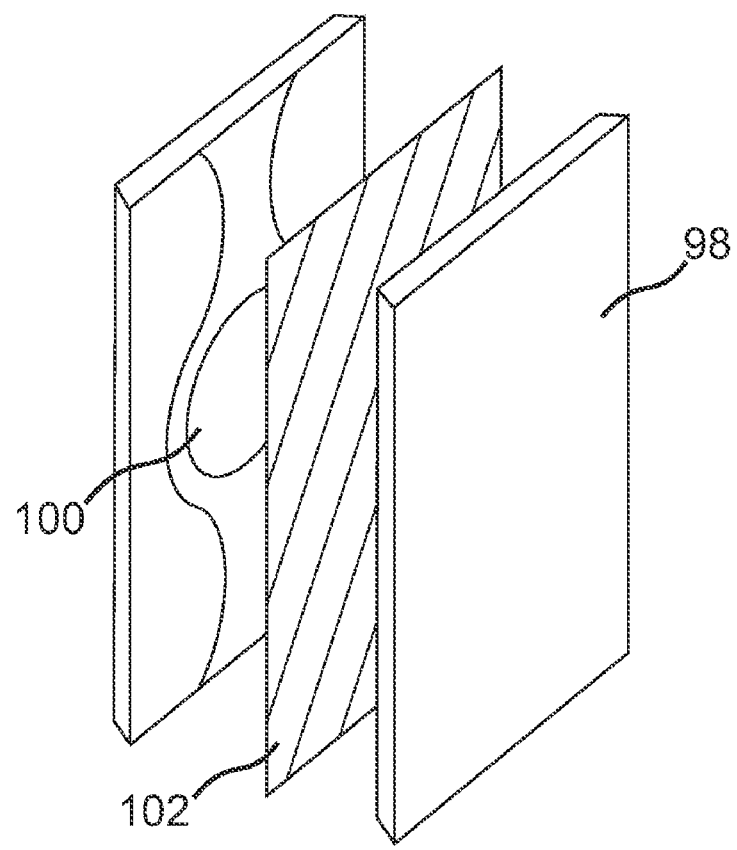
FIG. 10 illustrates an alternative embodiment of a reactor according to the present invention.

The term "comprising" encompasses "including" as well as "consisting" e.g. a composition "comprising" X may consist exclusively of X or may include something additional e.g. X+Y.

The word "substantially" does not exclude "completely" e.g. a composition which is "substantially free" from Y may be completely free from Y. Where necessary, the word "substantially" may be omitted from the definition of the invention.

The term "about" in relation to a numerical value x means, for example, x±10%.

EXAMPLES

Example 1

Eleven electrodes were prepared using the method described below. A high purity refractory metal substrate 140 mm in diameter and 9.2 mm thick was prepared by electro-discharge machining from a larger blank. The surfaces of the refractory metal disc were lapped to a surface roughness (as defined by the $R_a$ of the surface) of between 0.5 µm and 2 µm. The refractory metal disc was then thoroughly cleaned using a solvent. Ultrasonic seeding using 2 µm to 4 µm diamond powder in suspension in propan-2-ol was used to seed the refractory metal substrate prior to diamond deposition.

A microwave plasma CVD technique was used to deposit a boron doped diamond layer on the refractory metal substrate. Diamond deposition was performed in a microwave CVD deposition system. The total gas flow was in the region of 3000 sccm, comprising 1% methane, 1% argon, balance hydrogen, with diborane ($B_2H_6$) added such that the diborane to methane ratio was 0.06%. The exact diborane to methane ratio required to achieve a given resistivity is a sensitive function of the exact deposition conditions and, as those skilled in the art will be aware, can vary substantially between synthesis systems. The diborane was added with hydrogen as a dilutant, in this case as 500 ppm diborane in hydrogen. The total hydrogen in the gas mixture includes the hydrogen used to dilute the diborane. The pressure in the chamber during deposition was $18 \times 10^3$ Pa (140 Torr). Deposition continued until the layer thickness was approximately 650 µm. On discontinuation of the deposition process the diamond layer was removed from the refractory metal substrate in a single piece.

After removal from the deposition system, the thicknesses and resistivities of the electrodes were determined over an array of 17 points. One point was positioned in the centre of the wafer, eight points were equally spaced around a circle of radius 31 mm centred at the centre of the wafer, and eight points were equally spaced around a circle of radius 62 mm centred at the centre of the wafer. For one wafer, given as a typical example, the thicknesses (in µm) measured were 722, 686, 688, 698, 685, 681, 683, 681, 692, 577, 564, 593, 608, 596, 601, 604 and 601, giving an average thickness of 645 µm, a maximum thickness of 722 µm (11.9% above the average value) and a minimum thickness of 564 µm (12.6% below the average value).

The resistances measured at the same locations, values (in ma), were 132, 208, 191, 177, 187, 204, 213, 217, 199, 167, 163, 195, 197, 207, 245, 240 and 233. These were converted to resistivity values (in Ωcm) of 0.0429, 0.0642, 0.0591, 0.0556, 0.0576, 0.0625, 0.0655, 0.0665, 0.0620, 0.0434, 0.0414, 0.0520, 0.0539, 0.0555, 0.0663, 0.0652 and 0.0630, giving an average value of 0.0574 Ωcm, a maximum resistivity value of 0.0665 Ωcm (15.9% above the mean) and a minimum resistivity value of 0.414 Ωcm (27.9% below the mean).

The resistivity data for the remaining ten electrodes is shown in the tables below.

|  |  | Run | | | | | | | | |
|---|---|---|---|---|---|---|---|---|---|---|
|  |  | 1 | | | 2 | | | 3 | | |
|  |  | A | B | C | A | B | C | A | B | C |
| Point | 17 | 675 | 223 | 0.0682 | 601 | 233 | 0.0635 | 725 | 154 | 0.0506 |
|  | 16 | 640 | 235 | 0.0682 | 604 | 240 | 0.0657 | 710 | 174 | 0.0560 |
|  | 15 | 636 | 231 | 0.0666 | 601 | 245 | 0.0667 | 670 | 201 | 0.0610 |
|  | 14 | 641 | 286 | 0.0831 | 596 | 207 | 0.0559 | 689 | 223 | 0.0696 |
|  | 13 | 651 | 262 | 0.0773 | 608 | 197 | 0.0543 | 674 | 203 | 0.0620 |
|  | 12 | 658 | 226 | 0.0674 | 593 | 195 | 0.0524 | 665 | 180 | 0.0543 |
|  | 11 | 678 | 209 | 0.0642 | 567 | 163 | 0.0419 | 683 | 161 | 0.0498 |
|  | 10 | 670 | 204 | 0.0619 | 577 | 167 | 0.0437 | 691 | 132 | 0.0413 |
|  | 9 | 754 | 167 | 0.0571 | 692 | 199 | 0.0624 | 780 | 155 | 0.0548 |
|  | 8 | 748 | 171 | 0.0580 | 681 | 217 | 0.0670 | 780 | 154 | 0.0544 |
|  | 7 | 743 | 185 | 0.0623 | 683 | 213 | 0.0659 | 778 | 167 | 0.0589 |
|  | 6 | 742 | 199 | 0.0669 | 681 | 204 | 0.0630 | 775 | 179 | 0.0629 |
|  | 5 | 734 | 198 | 0.0659 | 685 | 187 | 0.0581 | 774 | 199 | 0.0698 |
|  | 4 | 744 | 199 | 0.0671 | 698 | 177 | 0.0560 | 763 | 199 | 0.0688 |
|  | 3 | 749 | 186 | 0.0631 | 688 | 191 | 0.0596 | 769 | 175 | 0.0610 |
|  | 2 | 739 | 160 | 0.0536 | 686 | 208 | 0.0647 | 766 | 189 | 0.0656 |
|  | 1 | 770 | 122 | 0.0426 | 722 | 132 | 0.0432 | 796 | 109 | 0.0393 |

-continued

|  |  |  |  |  |  |  |  |  |
|---|---|---|---|---|---|---|---|---|
| Average |  | 704 |  | 0.0643 | 645 |  | 0.0579 | 735 | | 0.0577 |
| Maximum |  | 770 |  | 0.0831 | 722 |  | 0.0670 | 796 | | 0.0698 |
| % deviation |  | 9.3 |  | 29.2 | 12.0 |  | 15.7 | 8.4 | | 21.1 |
| Minimum |  | 636 |  | 0.0426 | 567 |  | 0.0419 | 665 | | 0.0393 |
| % deviation |  | 9.7 |  | 33.8 | 12.1 |  | 27.6 | 9.5 | | 31.8 |

| | | Run | | | | | | | |
|---|---|---|---|---|---|---|---|---|---|
| | | 4 | | | 5 | | | 6 | |
| | | A | B | C | A | B | C | A | B | C |
| Point | 17 | 662 | 222 | 0.0666 | 513 | 188 | 0.0437 | 717 | 206 | 0.0669 |
|  | 16 | 647 | 214 | 0.0628 | 525 | 241 | 0.0573 | 677 | 208 | 0.0638 |
|  | 15 | 654 | 261 | 0.0774 | 489 | 251 | 0.0556 | 651 | 209 | 0.0617 |
|  | 14 | 642 | 227 | 0.0661 | 492 | 265 | 0.0591 | 675 | 296 | 0.0906 |
|  | 13 | 634 | 209 | 0.0601 | 506 | 313 | 0.0718 | 676 | 254 | 0.0778 |
|  | 12 | 623 | 269 | 0.0760 | 478 | 274 | 0.0594 | 680 | 220 | 0.0678 |
|  | 11 | 613 | 258 | 0.0717 | 498 | 278 | 0.0627 | 671 | 189 | 0.0575 |
|  | 10 | 647 | 220 | 0.0645 | 506 | 225 | 0.0516 | 683 | 169 | 0.0523 |
|  | 9 | 736 | 298 | 0.0994 | 565 | 205 | 0.0525 | 774 | 150 | 0.0526 |
|  | 8 | 732 | 297 | 0.0985 | 573 | 204 | 0.0530 | 765 | 150 | 0.0520 |
|  | 7 | 730 | 301 | 0.0996 | 568 | 218 | 0.0561 | 757 | 171 | 0.0587 |
|  | 6 | 728 | 299 | 0.0987 | 551 | 245 | 0.0612 | 764 | 189 | 0.0654 |
|  | 5 | 728 | 294 | 0.0970 | 562 | 277 | 0.0706 | 758 | 196 | 0.0673 |
|  | 4 | 731 | 288 | 0.0954 | 557 | 290 | 0.0732 | 758 | 172 | 0.0591 |
|  | 3 | 730 | 290 | 0.0960 | 561 | 261 | 0.0664 | 762 | 165 | 0.0570 |
|  | 2 | 741 | 310 | 0.1041 | 561 | 240 | 0.0610 | 752 | 150 | 0.0511 |
|  | 1 | 777 | 212 | 0.0747 | 581 | 151 | 0.0398 | 778 | 110 | 0.0388 |
| Average |  | 691 |  | 0.0828 | 534 |  | 0.0585 | 723 |  | 0.0612 |
| Maximum |  | 777 |  | 0.1041 | 581 |  | 0.0732 | 778 |  | 0.0906 |
| % deviation |  | 12.4 |  | 25.7 | 8.7 |  | 25.1 | 7.5 |  | 48.0 |
| Minimum |  | 613 |  | 0.0601 | 478 |  | 0.0398 | 651 |  | 0.0388 |
| % deviation |  | 11.3 |  | 27.5 | 10.6 |  | 32.1 | 10.0 |  | 36.6 |

| | | Run | | | | | | | |
|---|---|---|---|---|---|---|---|---|---|
| | | 7 | | | 8 | | | 9 | |
| | | A | B | C | A | B | C | A | B | C |
| Point | 17 | 601 | 233 | 0.0635 | 565 | 300 | 0.0768 | 750 | 153 | 0.0520 |
|  | 16 | 604 | 240 | 0.0657 | 534 | 310 | 0.0750 | 744 | 158 | 0.0533 |
|  | 15 | 601 | 245 | 0.0667 | 538 | 307 | 0.0749 | 737 | 149 | 0.0498 |
|  | 14 | 596 | 207 | 0.0559 | 547 | 357 | 0.0885 | 721 | 140 | 0.0457 |
|  | 13 | 608 | 197 | 0.0543 | 536 | 312 | 0.0758 | 737 | 135 | 0.0451 |
|  | 12 | 593 | 195 | 0.0524 | 553 | 266 | 0.0667 | 744 | 130 | 0.0438 |
|  | 11 | 564 | 163 | 0.0417 | 566 | 290 | 0.0744 | 706 | 109 | 0.0349 |
|  | 10 | 577 | 167 | 0.0437 | 565 | 252 | 0.0645 | 728 | 128 | 0.0422 |
|  | 9 | 692 | 199 | 0.0624 | 623 | 227 | 0.0641 | 835 | 131 | 0.0496 |
|  | 8 | 681 | 217 | 0.0670 | 615 | 244 | 0.0680 | 833 | 136 | 0.0513 |
|  | 7 | 683 | 213 | 0.0659 | 632 | 275 | 0.0788 | 847 | 135 | 0.0518 |
|  | 6 | 681 | 204 | 0.0630 | 631 | 294 | 0.0841 | 847 | 124 | 0.0476 |
|  | 5 | 685 | 187 | 0.0581 | 619 | 267 | 0.0749 | 859 | 114 | 0.0444 |
|  | 4 | 698 | 177 | 0.0560 | 618 | 245 | 0.0686 | 848 | 122 | 0.0469 |
|  | 3 | 688 | 191 | 0.0596 | 619 | 214 | 0.0600 | 849 | 108 | 0.0416 |
|  | 2 | 686 | 208 | 0.0647 | 622 | 220 | 0.0620 | 851 | 115 | 0.0444 |
|  | 1 | 722 | 132 | 0.0432 | 642 | 147 | 0.0428 | 875 | 79 | 0.0313 |
| Average |  | 645 |  | 0.0579 | 590 |  | 0.0706 | 795 |  | 0.0456 |
| Maximum |  | 722 |  | 0.0670 | 642 |  | 0.0885 | 875 |  | 0.0533 |
| % deviation |  | 12.0 |  | 15.8 | 8.9 |  | 25.4 | 10.1 |  | 16.8 |
| Minimum |  | 564 |  | 0.0417 | 534 |  | 0.0428 | 706 |  | 0.0313 |
| % deviation |  | 12.5 |  | 28.0 | 9.4 |  | 39.4 | 11.2 |  | 31.3 |

| | | Run 10 | | |
|---|---|---|---|---|
| | | A | B | C |
| Point | 17 | 637 | 290 | 0.0837 |
|  | 16 | 597 | 286 | 0.0774 |
|  | 15 | 596 | 267 | 0.0721 |
|  | 14 | 591 | 305 | 0.0817 |
|  | 13 | 582 | 248 | 0.0654 |

-continued

| | A | B | C |
|---|---|---|---|
| 12 | 586 | 241 | 0.0640 |
| 11 | 592 | 254 | 0.0682 |
| 10 | 609 | 234 | 0.0646 |
| 9 | 693 | 213 | 0.0669 |
| 8 | 677 | 234 | 0.0718 |
| 7 | 677 | 236 | 0.0724 |
| 6 | 680 | 245 | 0.0755 |
| 5 | 677 | 242 | 0.0743 |
| 4 | 673 | 243 | 0.0741 |
| 3 | 670 | 227 | 0.0689 |
| 2 | 676 | 225 | 0.0689 |
| 1 | 704 | 135 | 0.0431 |
| Average | | 642 | 0.0702 |
| Maximum | | 704 | 0.0837 |
| % deviation | | 9.6 | 19.3 |
| Minimum | | 582 | 0.0431 |
| % deviation | | 9.4 | 38.6 | wherein in the tables of data:
A = thickness in μm
B = Resistance in mΩ
C = Resistivity in Ωcm.

After the thickness and resistivity measurements were made, the edges of the as-grown wafers were laser trimmed using an Nd:YAG 1.06 μm laser to give 138 mm diameter electrodes. The electrodes produced had an average boron concentration of about $3 \times 10^{20}$ atoms/cm$^3$.

These electrodes were then used as bipolar electrodes in a reactor according to the present invention to process waste water.

Example 2

Five electrodes, made according to Example 1 were used as self-biasing bipolar electrodes in a reactor. Two similar electrodes, adapted to allow electrical connections to be made to them, were used as the terminal anode and cathode in the cell. The bipolar electrodes were mounted in polymethylmethacrylate (also referred to as 'acrylic') holders which slotted into a housing of the reactor. The anode and cathode were mounted in slightly different holders with soft polymer (silicone) seals to prevent exposure of the electrical connections to the liquid being electrolysed. The holders allow the spacing of the electrodes to be maintained at approximately 20 mm. The electrochemical cell consisted of an anode, a cathode and five bipolar electrodes within the reactor. The potential difference required between each pair of adjacent electrodes is about 5 V and so the anode and cathode were connected to a direct current (dc) supply capable of delivering high currents at a voltage of approximately 30 V. During operation the cell was run at a current density of approximately 0.5 A/cm$^2$, equivalent to a total current of approximately 75A.

The reactor was operated with a total area of bipolar electrode that was anodic of 663 cm$^2$. The reactor was operated with a total area of bipolar electrode that was cathodic of 663 cm$^2$. The reactor was operated with a total area of bipolar electrode that was anodic or cathodic of 1,326 cm$^2$.

The cell was used to treat a mixture of chemical species including water, sulphuric acid and water-soluble organic compounds such as acetone and other ketones, esters and phenol-based compounds. The total concentration of organic compounds in the solution was approximately 25 g/dm$^3$. The total volume of liquid to be treated was 500 dm$^3$.

The liquid was pumped around the cell in a serpentine manner such that it passed all the electrodes and the electrodes were continuously submerged by the liquid. The flow rate through the pump was approximately 80 dm$^3$/min. The flow rate through the reactor per bipolar electrode was 80 dm$^3$/min.

The temperature of the liquid during the operation of the cell was between 40° C. and 50° C.

The organic compounds in the electrolyte were directly oxidised in the cell to simple inorganic species such as water, carbon dioxide and nitrogen. After 60 minutes of operation, the phenol concentration had dropped to approximately 60% of the initial concentration. A further 60 minutes of operation further reduced the phenol concentration to approximately 30% of the initial concentration.

Example 3

A series of twenty-one 138 mm diameter boron doped diamond electrodes were prepared as described in Example 1. The electrodes are used in a similar reactor to that used in Example 2 except that the cell contained 21 bipolar electrodes instead of 5. The reactor also contained an anode and a cathode as in the previous example. The flow pattern was a parallel flow pattern.

The reactor was operated with a total area of bipolar electrode that was anodic of approximately 5,574 cm$^2$. The reactor was operated with a total area of bipolar electrode that was cathodic of approximately 5,574 cm$^2$. The reactor was operated with a total area of bipolar electrode that was anodic or cathodic of approximately 11,144 cm$^2$.

The cell was used for treating waste consisting of water containing phosphite ions. The desired electrochemical process is to oxidise the phosphite ions to phosphate ions, which can subsequently be precipitated out, according to the reaction:

$$HPO_3^{2-} \rightarrow PO_4^{3-}$$

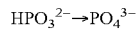

A total of 1.5 m$^3$ of water-based effluent with an initial concentration of $HPO_3^{2-}$ of 10,080 ppm was treated. The current density for the cell was 1.3-1.4 A/cm$^2$ requiring a voltage of approximately 110 V. The effluent was pumped through the cell at a rate of about 630 dm$^3$/min (~38 m$^3$/hr). The cell was run for 2 hours and over this period the $HPO_3^{2-}$ concentration was reduced to 150 ppm. After a further 2 hours of operation the $HPO_3^{2-}$ concentration had been further reduced to 114 ppm.

The flow rate through the cell was about 30 dm³/min per bipolar electrode.

The treatment process represents a reduction in the phosphite concentration of 98.5%.

Example 4

Three 138 mm diameter boron doped diamond electrodes were prepared as described in Example 1. The electrodes were used in a reactor similar to Example 2 except that the reactor contained three bipolar electrodes instead of five. The flow pattern was a parallel flow pattern with an interelectrode gap of 3 mm.

The reactor was operated with a total area of bipolar electrode that was anodic of approximately 398 cm². The reactor was operated with a total area of bipolar electrode that was cathodic of approximately 398 cm². The reactor was operated with a total area of bipolar electrode that was anodic or cathodic of approximately 796 cm².

The cell was used for treating landfill leachate which contained many different and largely unidentified compounds. The leachate was characterised by having a chemical oxygen demand (COD) level of approximately 1000 mg/dm³ and an ammonia ($NH_3$) content of about 1000 mg/dm³. A total of 10 dm³ of effluent was treated at a current density of approximately 1500 $\mu m^{-2}$, the effluent being recycled and passed through the cell at a rate of approximately 12 dm³/min (~0.72 m³/hr). After 4 hours both the COD level and the $NH_3$ level had been reduced to less than 200 mg/dm³. The total energy required to perform this reduction was 3 kWh.

The invention claimed is:

1. A reactor comprising an anode, a cathode and at least one bipolar electrode having first and second major working surfaces positioned therebetween wherein the at least one bipolar electrode consists essentially of diamond and the diamond comprises a dopant such that the diamond is conductive and has an electrical resistivity of 1 MΩcm or less and wherein the average concentration of the dopant in a region of at least one of the major working surfaces to a depth of 50 nm is at least $8 \times 10^{19}$ atoms/cm³.

2. A reactor according to claim 1, wherein the average concentration of the dopant in a region of both of the major working surfaces to a depth of 50 nm is at least $8 \times 10^{19}$ atoms/cm³.

3. A method of treating a fluid, wherein the fluid to be treated is passed through a reactor as defined in claim 1.

4. A method according to claim 3, wherein the anode and the cathode are formed from the same material and the polarity of these electrodes is reversed periodically.

5. A method according to claim 3, wherein the fluid to be treated is passed through the reactor in a serpentine manner.

6. A method according to claim 3, wherein the fluid to be treated is passed through the reactor in a parallel manner.

7. A method according to claim 3, wherein a salt is added to the fluid to be treated.

8. A method according to claim 3, wherein the fluid is at a temperature of greater than 30° C.

9. A method according to claim 3, wherein the flow through the reactor is at least 0.5 m³/hour.

10. A method according to claim 3, wherein the flow through the reactor per bipolar electrode is at least 0.1 m³/hour.

11. A method according to claim 3, wherein the fluid to be treated is waste water.

12. A method according to claim 11, wherein a current density of at least 1000 A/m² is applied to the electrodes.

13. A method according to claim 3, wherein the fluid to be treated is pharmaceutical effluent.

14. A method according to claim 1, wherein a potential difference in the range from 0.5 to 20 V is applied between any anode and adjacent cathode.

15. A reactor comprising an anode, a cathode and at least one bipolar electrode having first and second major working surfaces positioned therebetween wherein the at least one bipolar electrode consists essentially of diamond and the diamond comprises a dopant such that the diamond is conductive and has an electrical resistivity of 1 MΩcm or less and wherein the average concentration of the dopant in a region of at least one of the major working surfaces to a depth of 50 nm is greater than ⅕ of the average concentration of the dopant in the remainder of the at least one bipolar electrode.

16. A reactor according to claim 15, wherein the average concentration of the dopant in a region of both of the major working surfaces to a depth of 50 nm is greater than ⅕ of the average concentration of the dopant in the remainder of the bipolar electrode.

17. A reactor according to claim 15, wherein the dopant is boron.

18. A reactor according to claim 17, wherein the average concentration of boron is less than $3 \times 10^{21}$ atoms/cm³.

19. A reactor according to claim 15, wherein the dopant is dispersed uniformly throughout the diamond bipolar electrode.

20. A reactor according to claim 19, wherein the uniformity is such that the concentration of dopant atoms in any 1 mm³ volume does not vary from the concentration of dopant atoms in any other 1 mm³ by more than 50%.

21. A reactor according to claim 20, wherein for a series of at least 5 measurements taken at regularly spaced intervals along a line perpendicular to a major working surface of the bipolar electrode, the maximum dopant concentration measured is less than 150% of the mean value and the minimum dopant concentration is more than 50% of the mean value.

22. A reactor according to claim 15 wherein the diamond is polycrystalline diamond.

23. A reactor according to claim 15, wherein the at least one bipolar electrode has an electrical resistivity in the range from 0.005 Ωcm to 0.50 Ωcm.

24. A reactor according to claim 15, wherein one of the major working surfaces is the as-grown nucleation face.

25. A reactor according to claim 15, wherein one of the major working surfaces is the as-grown growth face.

26. A reactor according to claim 15, wherein the first major working surface is the as-grown nucleation face and the second major working surface is the as-grown growth face.

27. A reactor according to claim 15, wherein the at least one bipolar electrode is a planar disc.

28. A reactor according to claim 15, wherein the at least one bipolar electrode has a thickness in the range from 0.2 mm to 2 mm.

29. A reactor according to claim 15, wherein the at least one bipolar electrode has a major working surface having an area of at least 10 cm².

30. A reactor according to claim 15, wherein the at least one bipolar electrode has a thickness uniformity such that the minimum thickness as measured using the 17-point array technique is more than 60% of the mean thickness and the maximum thickness measured is less than 135% of the mean thickness.

31. A reactor according to claim 15, wherein the at least one bipolar electrode has a longest dimension of at least 10 mm.

32. A reactor according to claim 15, wherein the material comprising the at least one bipolar electrode has an absolute strength measured in three-point bend of greater than 300 MPa.

33. A reactor according to claim 15 which comprises at least 2 bipolar electrodes positioned between the anode and the cathode.

34. A reactor according to claim 15 which comprises at least 20 bipolar electrodes positioned between the anode and the cathode.

35. A reactor according to claim 15, wherein the separation between any two adjacent electrodes, as measured normal to the face of one of the electrodes, does not vary by more than 30%.

36. A reactor according to claim 15, wherein the bipolar electrodes are separated by a distance in the range from 0.5 mm to 50 mm.

37. A reactor according to claim 15, wherein the at least one bipolar electrode has an operational lifetime of $0.2 \times 10^6$ Ah/m$^2$ or more.

38. A reactor according to claim 15, wherein the at least one bipolar electrode is mounted in a carrier plate which incorporates inlet and outlet manifolds.

39. A reactor according to claim 15, wherein the at least one bipolar electrode is mounted in an acrylic carrier plate.

40. A reactor according to claim 15, which further comprises a sensor.

41. A reactor according to claim 40, wherein the sensor is a COD sensor.

42. A reactor according to claim 15, further comprising a semi-permeable membrane between at least one pair of adjacent electrodes.

43. An electrode consisting essentially of diamond wherein the diamond comprises a dopant such that the diamond is conductive and has an electrical resistivity of 1 MΩcm or less and wherein the average concentration of dopant in a region of at least one of the major working surfaces, to a depth of 50 nm, is at least $8 \times 10^{19}$ atoms/cm$^3$ and wherein the electrode has at least one of the following features a) the concentration of dopant atoms in any 1 mm$^3$ volume does not vary from the concentration of dopant atoms in any other 1 mm$^3$ by more than 50%, b) the uniformity of doping through the thickness of the electrode when measured by SIMS at least five points approximately uniformly spaced through the thickness is such that the maximum dopant concentration is less than about 150% of the mean value and the minimum concentration is greater than about 50% of the mean value, c) a thickness in the range 0.2 mm to 5 mm, d) at least one lateral dimension of at least 10 mm, and, e) a surface area of at least 10 cm$^2$.

44. An electrode according to claim 43, which has a thickness in the range from 0.2 mm to 5 mm.

45. An electrode according to claim 43, which has a longest dimension of at least 10 mm.

46. An electrode according to claim 43 having a thickness uniformity such that the minimum thickness as measured using the 17-point array technique is more than 60% of the mean thickness and the maximum thickness measured is less than 135% of the mean thickness.

47. An electrode according to claim 43 having an absolute strength measured in three-point bend of greater than 300 MPa.

48. An electrode according to claim 43, wherein one of the major working surfaces is the as-grown nucleation face.

49. An electrode according to claim 42, wherein one of the major working surfaces is the as-grown growth face.

50. An electrode according to claim 43, wherein the first major working surface is the as-grown nucleation face and the second major working surface is the as-grown growth face.

51. An electrode according to claim 43, which is circular.

52. An electrode as defined in claim 43, having an operational lifetime of $0.2 \times 10^6$ Ah/m$^2$ or more.

53. A reactor comprising an electrode as defined in claim 43.

* * * * *